(12) United States Patent
Cheng et al.

(10) Patent No.: US 10,362,605 B2
(45) Date of Patent: Jul. 23, 2019

(54) SYSTEMS AND METHODS FOR MULTIPLEXING SCHEDULING REQUESTS IN UNLICENSED BANDS

(71) Applicant: Telefonaktiebolaget LM Ericsson (publ), Stockholm (SE)

(72) Inventors: Jung-Fu Cheng, Fremont, CA (US); Oskar Drugge, Hjärup (SE); Havish Koorapaty, Saratoga, CA (US); Amitav Mukherjee, Fremont, CA (US); Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/459,233

(22) Filed: Mar. 15, 2017

(65) Prior Publication Data

US 2017/0215206 A1 Jul. 27, 2017

Related U.S. Application Data

(63) Continuation of application No. PCT/SE2017/050054, filed on Jan. 20, 2017.

(60) Provisional application No. 62/281,487, filed on Jan. 21, 2016.

(51) Int. Cl.
*H04W 16/14* (2009.01)
*H04W 72/12* (2009.01)
*H04W 74/08* (2009.01)

(52) U.S. Cl.
CPC ....... *H04W 74/0816* (2013.01); *H04W 16/14* (2013.01); *H04W 72/1284* (2013.01)

(58) Field of Classification Search
CPC ............ H04W 74/0816; H04W 16/14; H04W 72/1284
See application file for complete search history.

(56) References Cited

U.S. PATENT DOCUMENTS

| | | | |
|---|---|---|---|
| 2013/0242824 A1* | 9/2013 | Lee | H04L 1/1819 370/281 |
| 2014/0161086 A1* | 6/2014 | Tamura | H04W 72/14 370/329 |
| 2015/0365880 A1 | 12/2015 | Malladi et al. | |
| 2016/0100407 A1* | 4/2016 | Gaal | H04W 72/0453 370/329 |
| 2017/0027002 A1* | 1/2017 | Yerramalli | H04W 74/004 |
| 2017/0164397 A1* | 6/2017 | Zeng | H04W 72/1278 |

(Continued)

OTHER PUBLICATIONS

3GPP TSG RAN WG1 Meeting #82, Beijing, China, R1-154541, Source: ITL, Title: On discontinuous transmission bursts for LAA, Agenda Item: 7.2.4.3, Document for: Discussion and Decision, Aug. 24-28, 2015, 5 pages.

(Continued)

*Primary Examiner* — Noel R Beharry
*Assistant Examiner* — Nicole King
(74) *Attorney, Agent, or Firm* — Baker Botts, LLP

(57) ABSTRACT

According to certain embodiments, a method implemented in a wireless device is provided that includes determining that a scheduling request (SR) cannot be transmitted on an uplink during a scheduled SR opportunity. The SR is transmitted in a first transmission opportunity following a partial downlink (DL) subframe from a network node (115).

27 Claims, 25 Drawing Sheets

(56) References Cited

U.S. PATENT DOCUMENTS

2017/0171856 A1* 6/2017 Zeng ................. H04W 72/0413
2018/0132271 A1* 5/2018 Jung .................... H04W 16/14

OTHER PUBLICATIONS

3GPP TSG RAN WG1 Meeting #82bis, Malmö, Sweden, R1-155785, Source: CMCC, Title: Discussion on issues related to UL channel access for LAA, Agenda Item. 7.2.3.1, Document for: Discussion and Decision, Oct. 5-9, 2015, 4 pages.
PCT International Search Report for International application No. PCT/SE2017/050054, dated May 9, 2017, 5 pages.
PCT Written Opinion of the International Searching Authority for International application No. PCT/SE2017/050054, dated May 9, 2017, 10 pages.

* cited by examiner

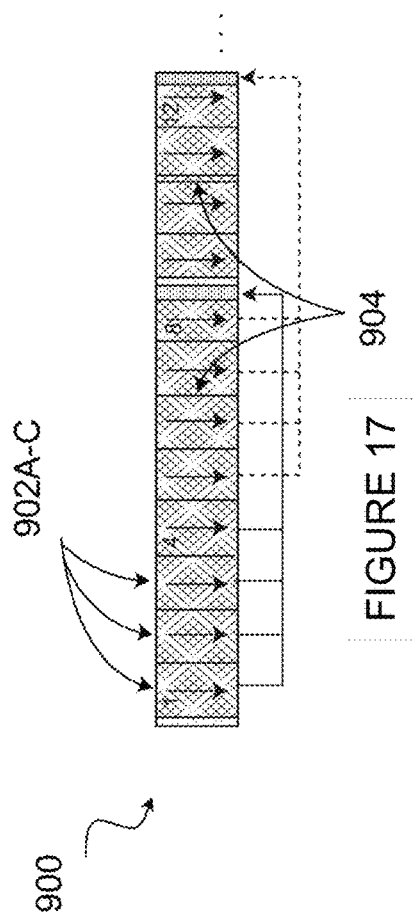
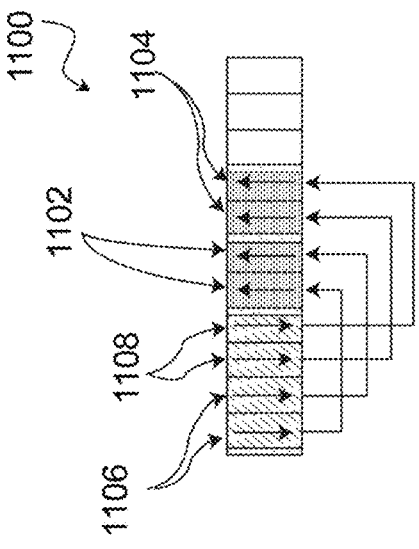
FIGURE 17
FIGURE 18
FIGURE 19

SYSTEMS AND METHODS FOR MULTIPLEXING SCHEDULING REQUESTS IN UNLICENSED BANDS

PRIORITY

This application is a U.S. Continuation Application filed under 35 U.S.C. § 111(a) of International Patent Application Serial No. PCT/SE2017/050054, filed Jan. 20, 2017, and entitled "Systems And Methods For Multiplexing Scheduling Requests In Unlicensed Bands" which claims priority to U.S. Provisional Patent Application No. 62/281,487 filed Jan. 21, 2016, both of which are hereby incorporated by reference in their entirety.

TECHNICAL FIELD

The present disclosure relates, in general, to wireless communications and, more particularly, to multiplexing scheduling requests in unlicensed bands.

BACKGROUND

The 3GPP Rel-13 feature "License-Assisted Access" (LAA) allows LTE equipment to also operate in the unlicensed 5 GHz radio spectrum. The unlicensed 5 GHz spectrum is used as a complement to the licensed spectrum. An ongoing 3GPP Rel-14 work item adds UL transmissions to LAA. Accordingly, devices such as LTE user equipment (UEs), for example, connect in the licensed spectrum (primary cell or PCell) and use carrier aggregation to benefit from additional transmission capacity in the unlicensed spectrum (secondary cell or SCell). Standalone operation of LTE in unlicensed spectrum is also possible and is under development by the MuLTEfire Alliance.

For the case of standalone LTE-U, the initial random access (RA) and subsequent uplink (UL) transmissions take place entirely on the unlicensed spectrum. Regulatory requirements may not permit transmissions in the unlicensed spectrum without prior channel sensing. Since the unlicensed spectrum must be shared with other radios of similar or dissimilar wireless technologies, a so-called listen-before-talk (LBT) procedure may be used. LBT involves sensing the medium for a pre-defined minimum amount of time and backing off if the channel is busy. Today, the unlicensed 5 GHz spectrum is mainly used by equipment implementing the IEEE 802.11 Wireless Local Area Network (WLAN) standard, also known under its marketing brand as "Wi-Fi."

FIG. 1 illustrates the basic LTE downlink physical resource. LTE uses Orthogonal Frequency Division Multiplexing (OFDM) in the downlink and Discrete Fourier Transform (DFT)-spread OFDM (also referred to as single-carrier FDMA (SC-FDMA)) in the uplink. The basic LTE downlink physical resource can thus be seen as a time-frequency grid, where each resource element corresponds to one OFDM subcarrier during one OFDM symbol interval. The uplink subframe has the same subcarrier spacing as the downlink, and the same number of SC-FDMA symbols in the time domain as OFDM symbols in the downlink.

FIG. 2 illustrates the LTE time-domain structure. In the time domain, LTE downlink transmissions are organized into radio frames of 10 ms, each radio frame consisting of ten equally-sized subframes of length $T_{subframe}=1$ ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs.

Furthermore, the resource allocation in LTE is typically described in terms of resource blocks (RBs), where a RB corresponds to one slot (0.5 ms) in the time domain and twelve contiguous subcarriers in the frequency domain. A pair of two adjacent RBs in time direction (1.0 ms) is known as a resource block pair. RBs are numbered in the frequency domain, starting with 0 from one end of the system bandwidth.

Downlink transmissions are dynamically scheduled. Specifically, in each subframe the base station transmits control information about which terminals data is transmitted to and upon which resource blocks the data is transmitted, in the current downlink subframe. This control signaling is typically transmitted in the first 1, 2, 3, or 4 OFDM symbols in each subframe and the number n=1, 2, 3, or 4 is known as the Control Format Indicator (CFI). The downlink subframe also contains common reference symbols, which are known to the receiver and used for coherent demodulation of the control information. A downlink subframe with CFI=3 OFDM symbols as control is illustrated in FIG. 3. The reference symbols shown there are the cell specific reference symbols (CRS) and are used to support multiple functions including fine time and frequency synchronization and channel estimation for certain transmission modes.

Uplink transmissions are dynamically scheduled, i.e., in each downlink subframe the base station transmits control information about which terminals should transmit data to the network node in subsequent subframes, and upon which resource blocks the data is transmitted. The uplink resource grid is comprised of data and uplink control information in the PUSCH, uplink control information in the PUCCH, and various reference signals such as demodulation reference signals (DMRS) and sounding reference signals (SRS). DMRS are used for coherent demodulation of PUSCH and PUCCH data, whereas SRS is not associated with any data or control information but is generally used to estimate the uplink channel quality for purposes of frequency-selective scheduling. An example uplink subframe is shown in FIG. 4. Note that UL DMRS and SRS are time-multiplexed into the UL subframe, and SRS are always transmitted in the last symbol of a normal UL subframe. The PUSCH DMRS is transmitted once every slot for subframes with normal cyclic prefix, and is located in the fourth and eleventh SC-FDMA symbols.

From LTE Rel-11 onwards, DL or UL resource assignments can also be scheduled on the enhanced Physical Downlink Control Channel (EPDCCH). For Rel-8 to Rel-10 only the Physical Downlink Control Channel (PDCCH) is available. Resource grants are UE specific and are indicated by scrambling the DCI Cyclic Redundancy Check (CRC) with the UE-specific C-RNTI identifier.

If a wireless device, which may include a UE, has uplink data waiting for transmission in its buffer but does not have any scheduled UL grants, it can send a 1-bit scheduling request (SR) to the serving or primary cell using available PUCCH resources. The SR can be sent using PUCCH Format 1, or be multiplexed with HARQ ACK/NACK feedback in PUCCH Formats 1a, 1b, or 3. The SR modulation is based on on-off keying where a '+1' indicates the SR, and nothing is sent if SR is not transmitted. The UE-specific SR transmission periodicity and SR subframe offset are configured by higher-layer signaling, as shown in Table 1.

TABLE 1

SR periodicity and offset configurations (TS 36.213 v. 12.3.0, Rel-12)

| SR configuration Index $I_{SR}$ | SR periodicity (ms) $SR_{PERIODICITY}$ | SR subframe offset $N_{OFFSET, SR}$ |
|---|---|---|
| 0-4 | 5 | $I_{SR}$ |
| 5-14 | 10 | $I_{SR}$-5 |
| 15-34 | 20 | $I_{SR}$-15 |
| 35-74 | 40 | $I_{SR}$-35 |
| 75-154 | 80 | $I_{SR}$-75 |
| 155-156 | 2 | $I_{SR}$-155 |
| 157 | 1 | $I_{SR}$-157 |

Once an eNB receives a SR, it can send an UL grant to the UE and make additional scheduling decisions based on Buffer Status Reports sent by the UE on PUSCH.

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier. CA is illustrated in FIG. 5. A CA-capable UE is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

In typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle.

A general illustration of the listen before talk (LBT) mechanism of Wi-Fi is shown in FIG. 6. After a Wi-Fi station A transmits a data frame to a station B, station B shall transmit the ACK frame back to station A with a delay of 16 µs. Such an ACK frame is transmitted by station B without performing a LBT operation. To prevent another station interfering with such an ACK frame transmission, a station shall defer for a duration of 34 µs (referred to as DIFS) after the channel is observed to be occupied before assessing again whether the channel is occupied. Therefore, a station that wishes to transmit first performs a CCA by sensing the medium for a fixed duration DIFS. If the medium is idle then the station assumes that it may take ownership of the medium and begin a frame exchange sequence. If the medium is busy, the station waits for the medium to go idle, defers for DIFS, and waits for a further random backoff period.

Using the LBT protocol, when the medium becomes available, multiple Wi-Fi stations may be ready to transmit, which can result in collision. To reduce collisions, stations intending to transmit select a random backoff counter and defer for that number of slot channel idle times. The random backoff counter is selected as a random integer drawn from a uniform distribution over the interval of [0, CW]. The default size of the random backoff contention window, CWmin, is set in the IEEE specs. Note that collisions can still happen even under this random backoff protocol when there are many stations contending for the channel access. Hence, to avoid recurring collisions, the backoff contention window size CW is doubled whenever the station detects a collision of its transmission up to a limit, CWmax, also set in the IEEE specs. When a station succeeds in a transmission without collision, it resets its random backoff contention window size back to the default value CWmin.

FIG. 7 illustrates licensed-assisted access (LAA) to unlicensed spectrum using LTE carrier aggregation. Up to now, the spectrum used by LTE has been dedicated to LTE. This has the advantage that the LTE system does not need to care about the coexistence issue and the spectrum efficiency can be maximized. However, the spectrum allocated to LTE is limited, and the allocated spectrum cannot meet the ever increasing demand for larger throughput from applications and/or services. Therefore, a new study item has been initiated in 3GPP on extending LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in unlicensed spectrum in the same manner as in licensed spectrum can seriously degrade the performance of Wi-Fi, as Wi-Fi will not transmit once it detects the channel is occupied.

Furthermore, one way to utilize the unlicensed spectrum reliably is to transmit essential control signals and channels on a licensed carrier. That is, as shown in FIG. 7, a UE is connected to a PCell in the licensed band and one or more SCells in the unlicensed band. In this application, a secondary cell in unlicensed spectrum is referred to as a licensed-assisted access secondary cell (LAA SCell).

FIG. 8 illustrates UL LAA listen before talk (LBT). In Rel-13 LAA, LBT for DL data transmissions follow a random backoff procedure similar to that of Wi-Fi, with CW adjustments based on HARQ NACK feedback. Several aspects of UL LBT were discussed during Release 13. With regard to the framework of UL LBT, the discussion focused on the self-scheduling and cross-carrier scheduling scenarios. UL LBT imposes an additional LBT step for UL transmissions with self-scheduling, since the UL grant itself requires a DL LBT by the eNB. The UL LBT maximum CW size should then be limited to a very low value to overcome this drawback, if random backoff is adopted. Therefore, Release 13 LAA recommended that the UL LBT for self-scheduling should use either a single CCA duration of at least 25 µs (similar to DL DRS), or a random backoff scheme with a defer period of 25 µs including a defer duration of 16 us followed by one CCA slot, and a maximum contention window size chosen from X={3, 4, 5, 6, 7}. These options are also applicable for cross-carrier scheduling of UL by another unlicensed SCell. FIG. 8 illustrates an example UL LBT and UL transmission when the UL grant is sent on an unlicensed carrier.

SR transmission opportunities are not guaranteed for MuLTEfire due to LBT requirements and the possibility for any subframe to be used for either UL or DL transmissions. Therefore, a periodic SR opportunity may be blocked due to failed LBT or conflict with a DL transmission from the eNB. There is currently no solution for robust SR transmission and multiplexing in LBT systems with multiple users in general.

SUMMARY

To address the foregoing problems with existing solutions, disclosed is methods and systems for robust scheduling request (SR) transmission and multiplexing in LBT systems, such as MuLTEfire, Rel-14 LAA, and other versions of LTE in unlicensed bands.

According to certain embodiments, a method for multiplexing scheduling requests in unlicensed bands is implemented in a wireless device. The method includes determining that a scheduling request (SR) cannot be transmitted on an uplink during a scheduled SR opportunity. The SR is transmitted in a first transmission opportunity following a partial downlink (DL) subframe from a network node.

According to certain embodiments, a wireless device for multiplexing scheduling requests in unlicensed bands includes a memory storing instructions and a processor operable to execute the instructions to cause the processor to determine that a scheduling request (SR) cannot be transmitted on an uplink during a scheduled SR opportunity. The SR is transmitted in a first transmission opportunity following a partial DL subframe from a network node.

According to certain embodiments, a method for multiplexing scheduling requests in unlicensed bands is implemented in a network node. The method includes transmitting, by the network node, signaling that indicates a partial DL subframe to be subsequently transmitted to a wireless device. The partial DL subframe is transmitted to the wireless device. A scheduling request (SR) is received from the wireless device in a first transmission opportunity following the partial DL subframe.

According to certain embodiments, a network node for multiplexing scheduling requests in unlicensed bands is provided. The network node includes a memory storing instructions and a processor operable to execute the instructions to cause the processor to transmit signaling that indicates a partial DL subframe to be subsequently transmitted to a wireless device. The partial DL subframe is transmitted to the wireless device and a scheduling request (SR) is received from the wireless device in a first transmission opportunity following the partial DL subframe.

Certain embodiments of the present disclosure may provide one or more technical advantages. For example, in certain embodiments, deferred scheduling request transmissions may be multiplexed in an efficient and robust manner. This may advantageously improve overall system performance for such a system. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, on which:

FIG. 17 illustrates a sPUCCH with continuous Physical Downlink Shared Channel (PDSCH) allocation, in accordance with certain embodiments;

FIG. 18 illustrates an example sPUCCH having empty subframes, in accordance with certain embodiments;

FIG. 19 illustrates UCI from two different wireless devices in subsequent subframes requiring an additional Listen-Before-Talk (LBT) phase, in accordance with certain embodiments;

DETAILED DESCRIPTION

Scheduling request (SR) transmission opportunities are not guaranteed for MuLTEfire. For example, due to listen before talk (LBT) requirements, a periodic scheduling resource opportunity may be blocked. Additionally, because any subframe may be used for either uplink (UL) or downlink (DL) transmissions, there is the possibility that an UL SR may conflict with a DL transmission from a network node. Accordingly, there is a need for robust SR transmission and multiplexing in LBT systems that include multiple users.

Figure 1:
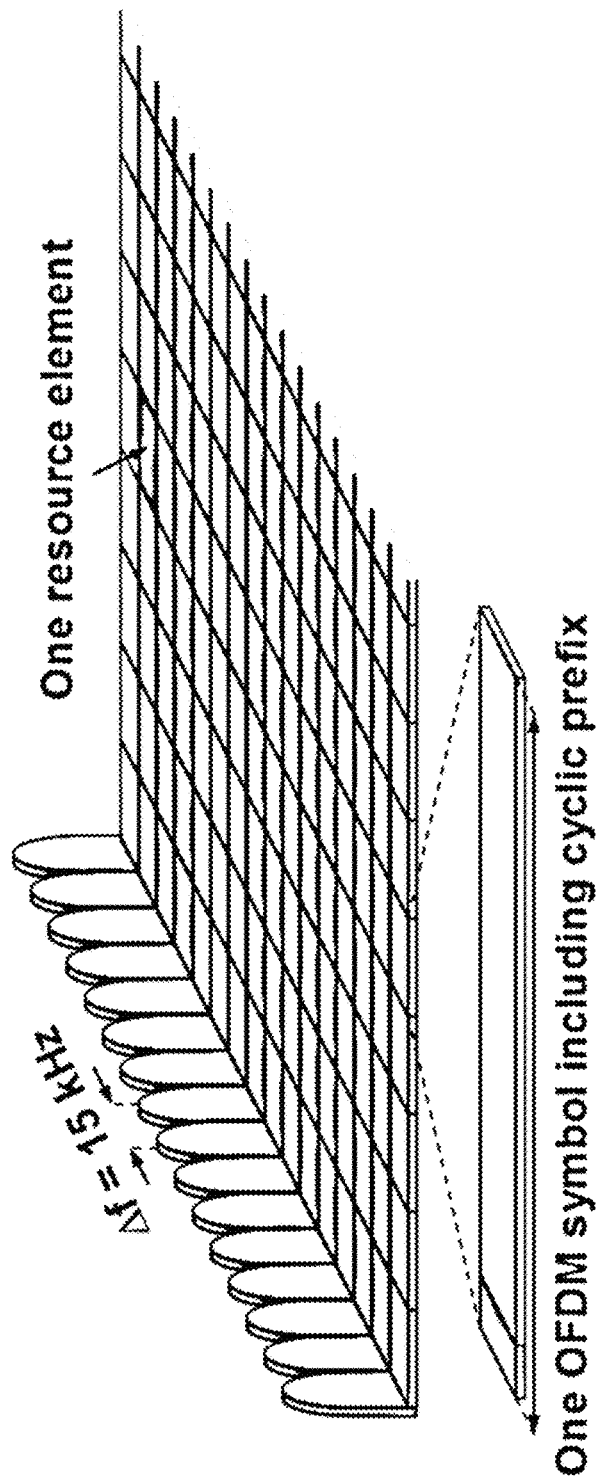
FIG. 1 illustrates the basic LTE downlink physical resource.
Figure 2:
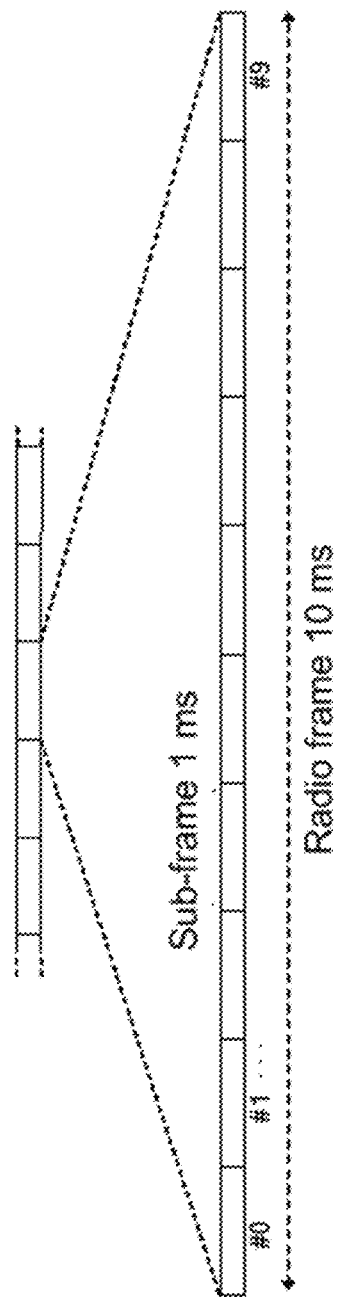
FIG. 2 illustrates the LTE time-domain structure.
Figure 3:
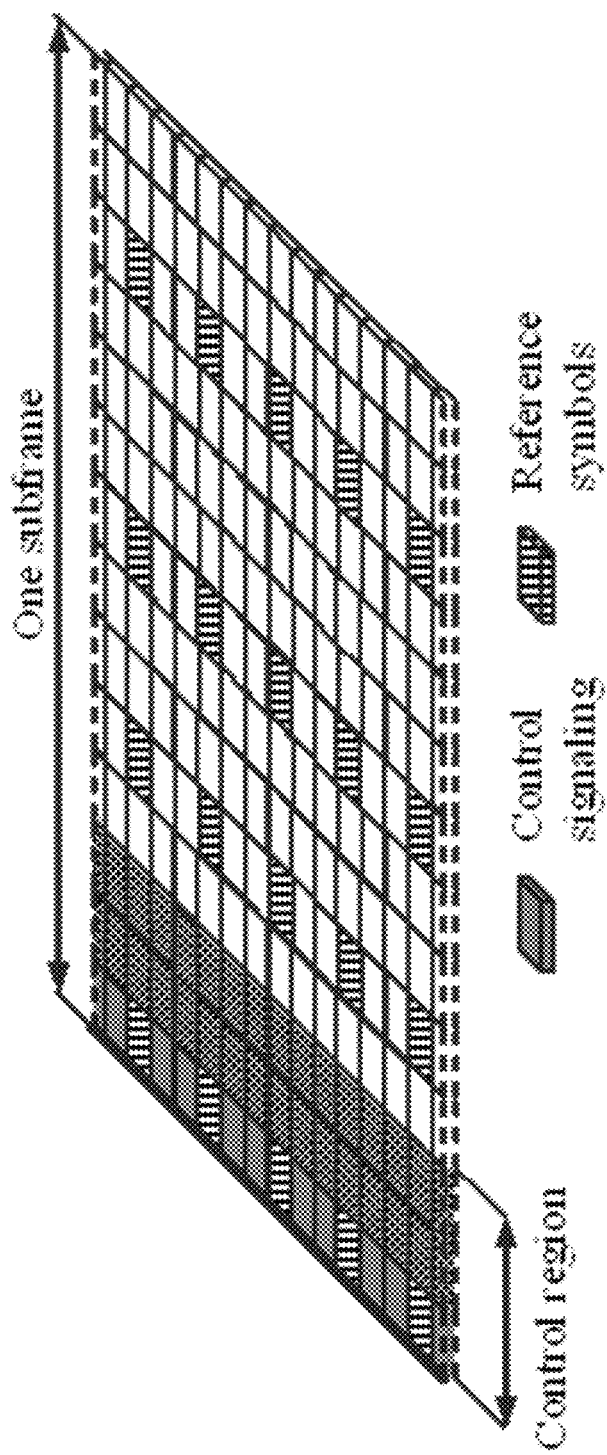
FIG. 3 illustrates an example downlink subframe.
Figure 4:
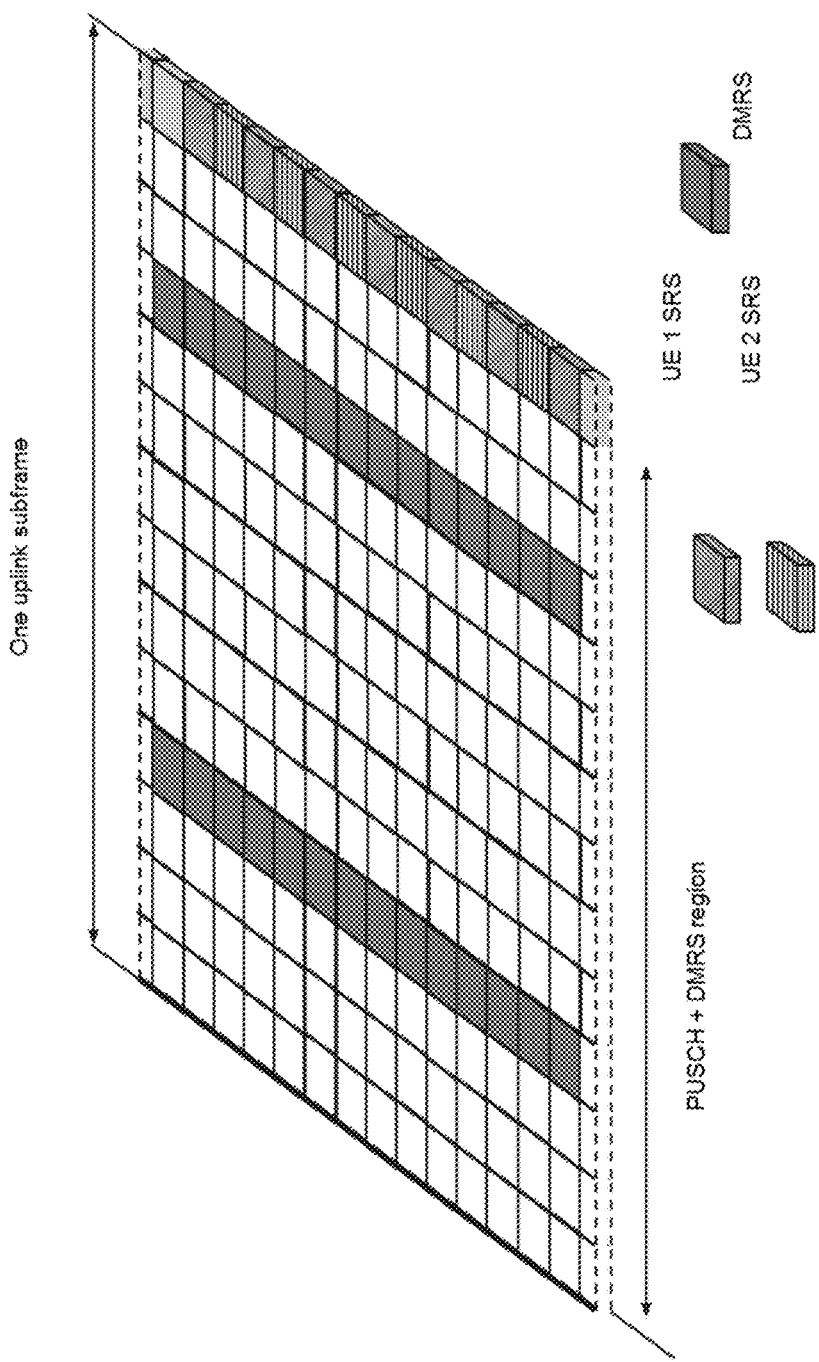
FIG. 4 illustrates an example uplink subframe.
Figure 5:
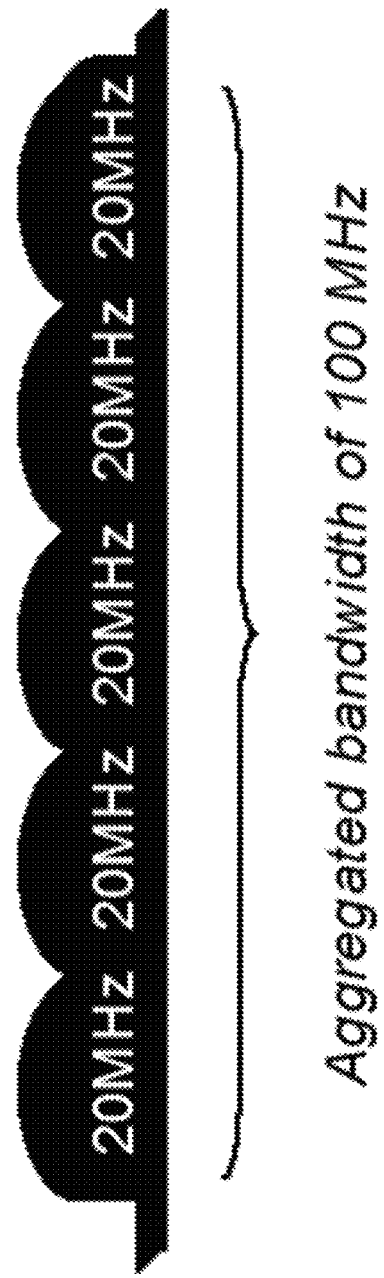
FIG. 5 illustrates carrier aggregation (CA)
Figure 6:
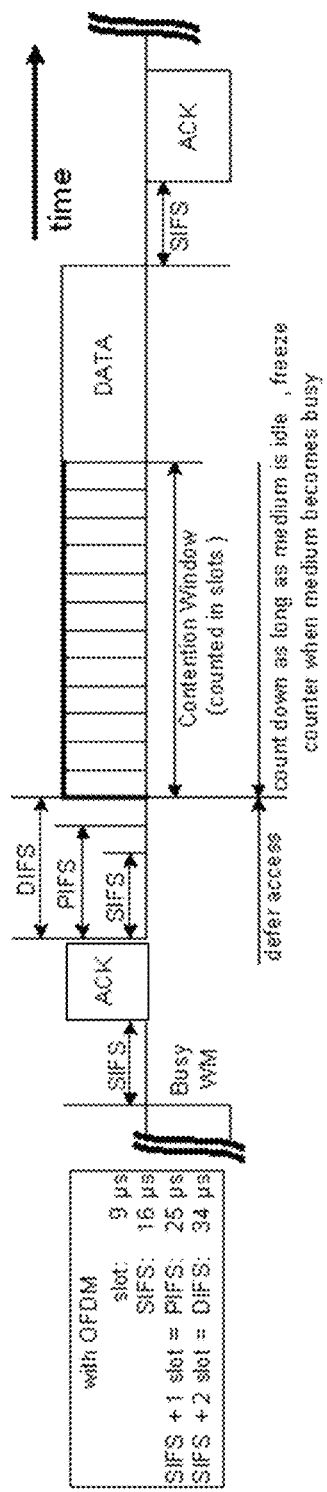
FIG. 6 illustrates a listen before talk (LBT) mechanism.
Figure 7:
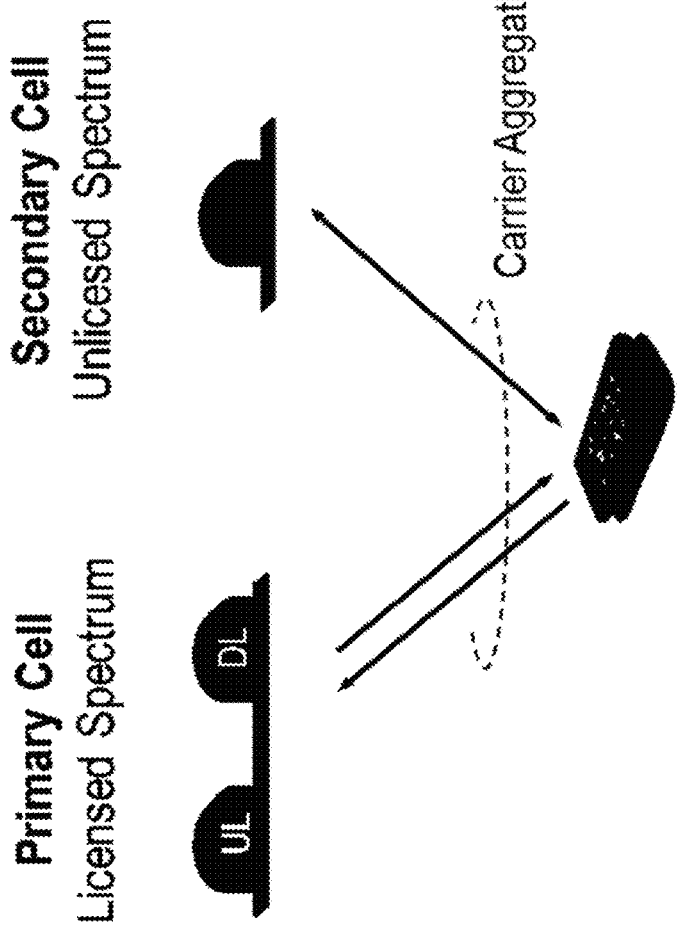
FIG. 7 illustrates licensed-assisted access (LAA) to unlicensed spectrum using LTE carrier aggregation.
Figure 8:
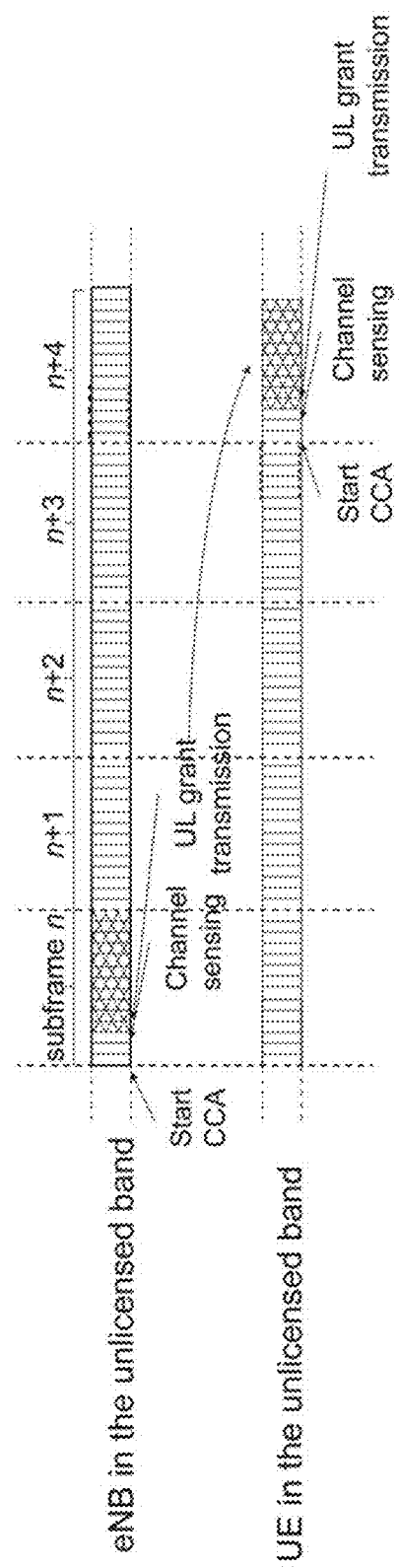
FIG. 8 illustrates uplink (UL) LAA LBT.
Figure 9:
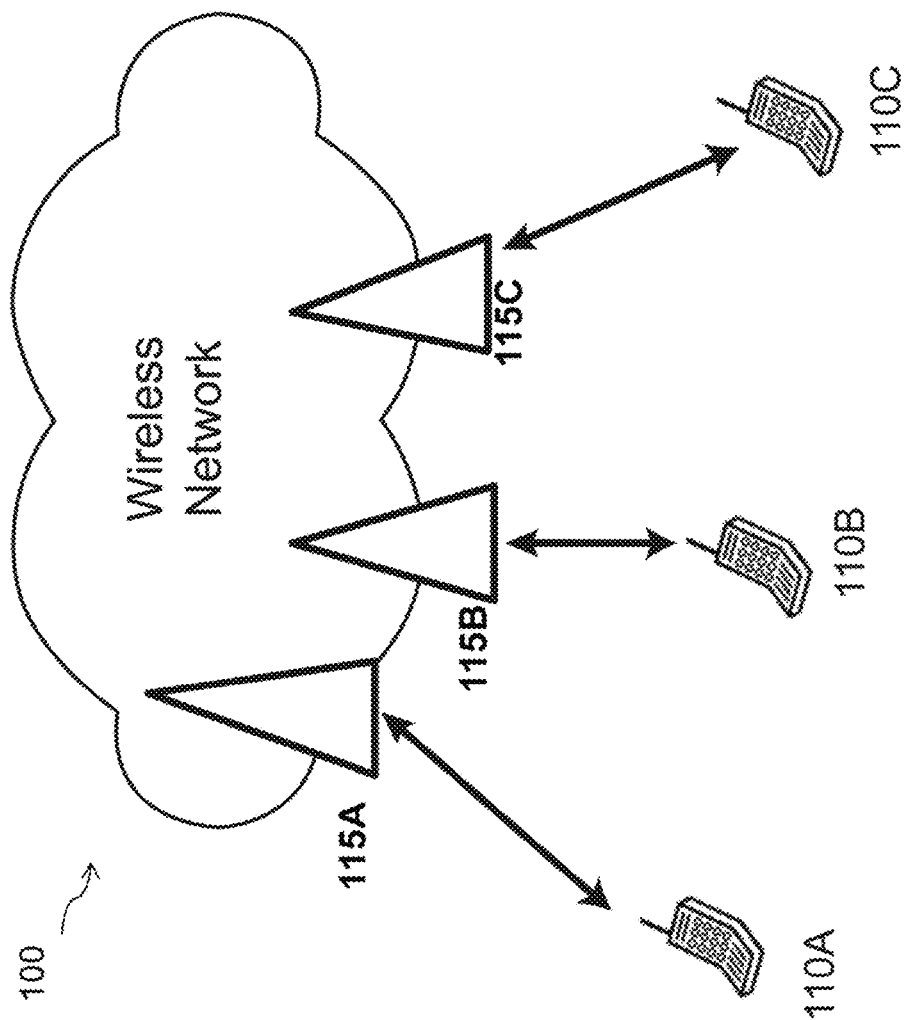
FIG. 9 illustrates an example network for multiplexing scheduling requests (SRs) in unlicensed bands, in accordance with certain embodiments.

Particular embodiments are described in FIGS. 1-27 of the drawings, like numerals being used for like and corresponding parts of the various drawings. FIG. 9 is a block diagram illustrating embodiments of a network 100 for multiplexing SRs in unlicensed bands, according to certain embodiments. Network 100 includes one or more wireless devices 110A-C, which may be interchangeably referred to as wireless devices 110 or UEs 110, and network nodes 115A-C, which may be interchangeably referred to as network nodes 115 or eNodeBs 115. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller (not depicted in FIG. 9). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, a core network node (not depicted in FIG. 9) may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of network nodes 115, wireless devices 110, and other network nodes are described in more detail with respect to FIGS. 10 and 11, respectively.

Although FIG. 9 illustrates a particular arrangement of wireless network 100, the present disclosure contemplates that the various embodiments described herein may be applied to a variety of networks having any suitable configuration. For example, wireless network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The SR multiplexing techniques described herein are applicable to both LAA LTE and standalone LTE operation in license-exempt channels. The described techniques are generally applicable for transmissions from both network nodes 115 and wireless devices 110.

Figure 10:
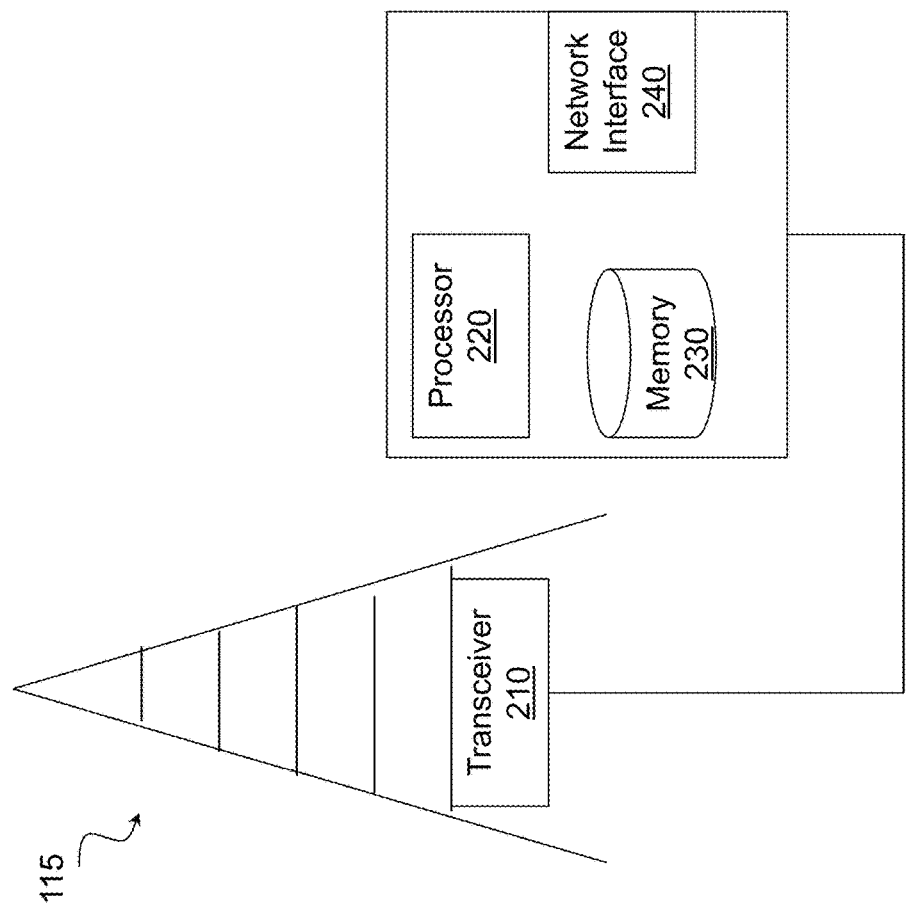
FIG. 10 illustrates an example network node for multiplexing SRs in unlicensed bands, in accordance with certain embodiments.

FIG. 10 is a block diagram illustrating certain embodiments of a network node 115 for multiplexing SRs in unlicensed bands. Examples of network node 115 include an eNodeB, a node B, a base station, a wireless access point (e.g., a Wi-Fi access point), a low power node, a base transceiver station (BTS), transmission points, transmission nodes, remote RF unit (RRU), remote radio head (RRH), etc. Network nodes 115 may be deployed throughout wireless network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 210, processor 220, memory 230, and network interface 240. In some embodiments, transceiver 210 facilitates transmitting wireless signals to and receiving wireless signals from wireless devices 110 (e.g., via an antenna), processor 220 executes instructions to provide some or all of the functionality described above as being provided by a network node 115, memory 230 stores the instructions executed by processor 220, and network interface 240 communicates signals to backend network components, such as a gateway, switch, router, Internet, Public Switched Telephone Network (PSTN), core network nodes 130, radio network controllers 120, etc.

Processor 220 may include any suitable combination of hardware and software implemented in one or more modules to execute instructions and manipulate data to perform some or all of the described functions of network node 115. In some embodiments, processor 220 may include, for example, one or more computers, one or more central processing units (CPUs), one or more microprocessors, one or more applications, and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 240 is communicatively coupled to processor 220 and may refer to any suitable device operable to receive input for network node 115, send output from network node 115, perform suitable processing of the input or output or both, communicate to other devices, or any combination of the preceding. Network interface 240 may include appropriate hardware (e.g., port, modem, network interface card, etc.) and software, including protocol conversion and data processing capabilities, to communicate through a network.

Other embodiments of network node 115 may include additional components beyond those shown in FIG. 10 that may be responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

Figure 11:
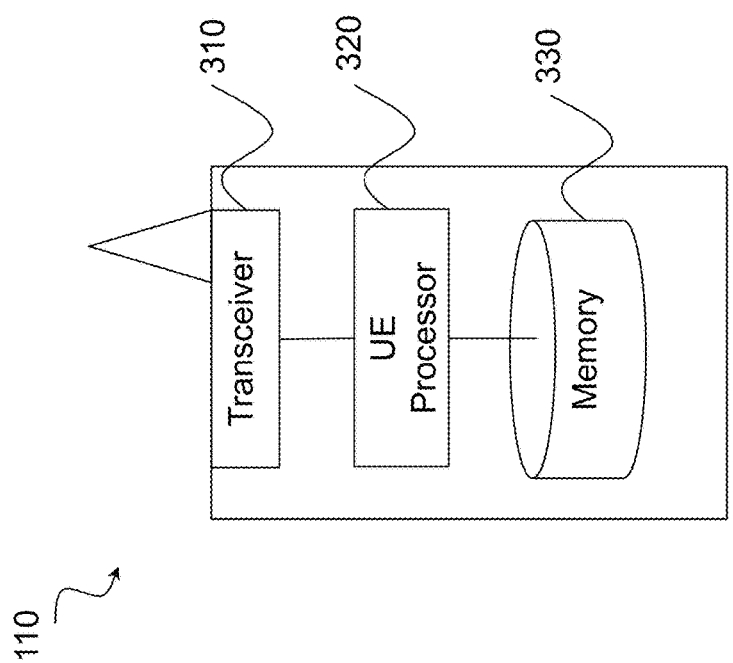
FIG. 11 illustrates an example wireless device for multiplexing SRs in unlicensed bands, in accordance with certain embodiments.

FIG. 11 illustrates an example wireless device 110 for multiplexing SRs in unlicensed bands, in accordance with certain embodiments. As depicted, wireless device 110 includes transceiver 310, processor 320, and memory 330. In some embodiments, transceiver 310 facilitates transmitting wireless signals to and receiving wireless signals from network node 115 (e.g., via an antenna), processor 320 executes instructions to provide some or all of the functionality described above as being provided by wireless device 110, and memory 330 stores the instructions executed by processor 320. Examples of a wireless device 110 are provided above.

Processor 320 may include any suitable combination of hardware and software implemented in one or more modules to execute instructions and manipulate data to perform some or all of the described functions of wireless device 110. In some embodiments, processor 320 may include, for example, one or more computers, one or more central processing units (CPUs), one or more microprocessors, one or more applications, circuitry, and/or other logic.

Memory 330 is generally operable to store instructions, such as a computer program, software, an application including one or more of logic, rules, algorithms, code, tables, etc. and/or other instructions capable of being executed by a processor. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 11 that may be responsible for providing certain aspects of the wireless device's functionality, including any of the functionality described above and/or any additional functionality (including any functionality necessary to support the solution described above).

In 3GPP LTE, the uplink control information (UCI) including HARQ-ACK, SR and periodic Control System Information (CSI) can be transmitted on the Physical Uplink Control Channel (PUCCH). For standalone operation in unlicensed band, two PUCCH formats can be considered for UCI transmission depending on the network node timing configuration and HARQ protocol. Stated differently, the PUCCH format may be of two formats: Short PUCCH (sPUCCH) that is n symbols (between 1-4) and long PUCCH (ePUCCH) that is 13-14 symbols. It may be beneficial that each UL serving cell carries the HARQ feedback for the corresponding DL serving cell in standalone LTE-U. This avoids a scenario where one cell determining the HARQ-ACK feedbacks of all cells. This approach may be different from LTE where the PUCCH of the PCell typically carries the UCI for all SCells. However, in terms of channel utilization and PUCCH format design, it may be beneficial to have independent PUCCH for each standalone carrier.

In certain embodiments, a short PUCCH (sPUCCH) occupies 1-3 SC-FDMA/OFDM symbols in time domain and spans the whole bandwidth by interlacing. A sPUCCH can be transmitted in the end of a partial DL subframe or as a part of an UL subframe (if the PUSCH is scheduled to the same wireless device). In order to transmit sPUCCH, an aggressive LBT may be applied by the wireless device 110. Alternatively, no LBT may be required if sPUCCH duration is below 5% of the duty cycle according to certain regulatory requirements.

Figure 12:
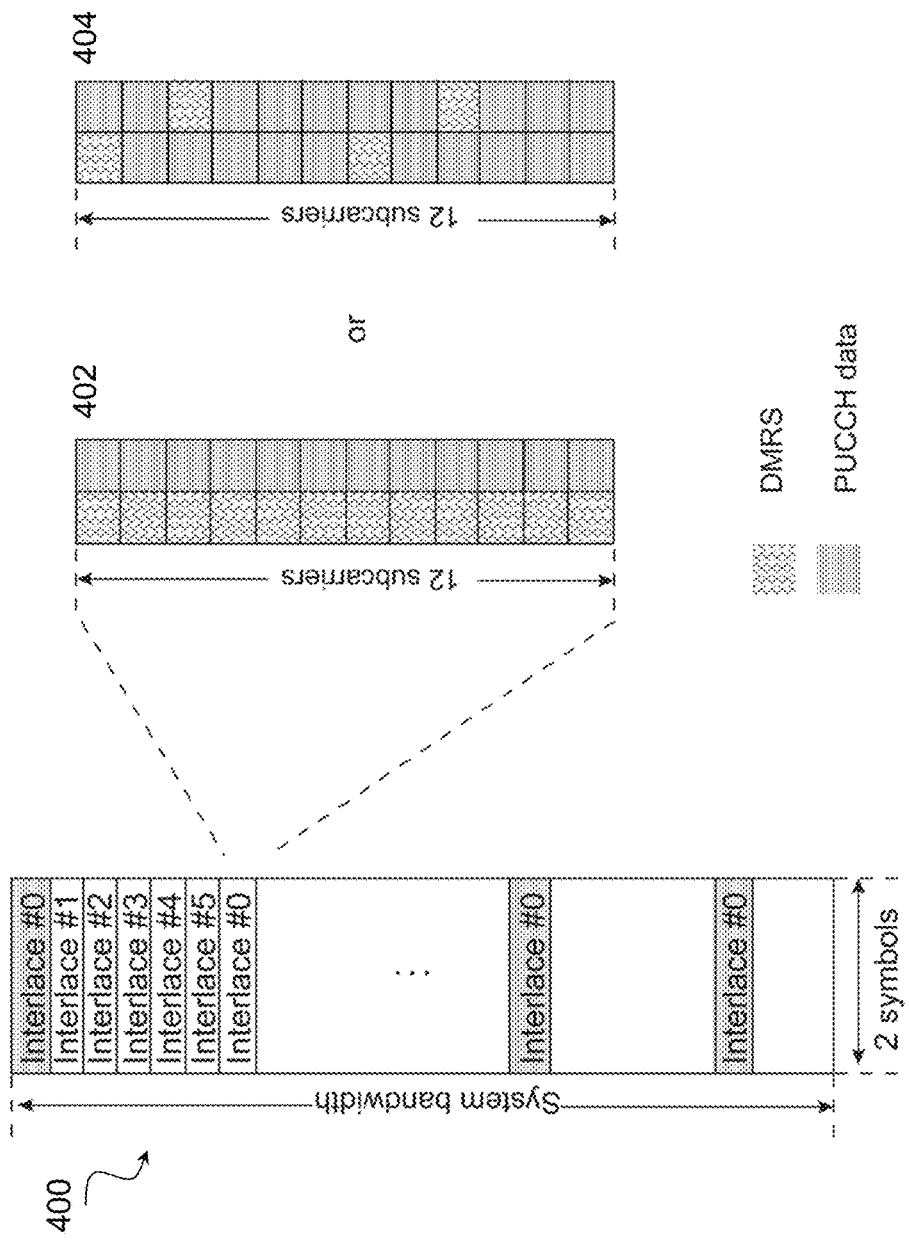
FIG. 12 illustrates an example of a short Physical Uplink Control Channel (sPUCCH), in accordance with certain embodiments.

FIG. 12 illustrates an example of a short PUCCH 400, in accordance with certain embodiments. As depicted, short PUCCH (or sPUCCH) occupies two SC-FDMA/OFDM symbols in time and one interlace in frequency domain. The DMRS and data symbol for PUCCH can be frequency multiplexed 402 or time multiplexed 404. Multiple PUCCH wireless devices can be multiplexed in the frequency domain by assigning different interlacing patterns and/or in the code domain by applying, for example, different orthogonal cover codes (OCCs) within a single interlace. The number of symbols, interlacing patterns, and OCC configuration (if any) can be configured for a wireless device 110 by network node signaling.

The HARQ feedback and the corresponding process IDs could either be listed explicitly or e.g. be provided as a bitmap (one or two bits per process). To align the design with 3GPP Rel-13 CA, the UCI on sPUCCH is attached with an 8-bit CRC and encoded using Tail Biting Convolutional Code (TBCC). The encoded symbols are mapped to available REs in a frequency first time second manner.

Figure 13:
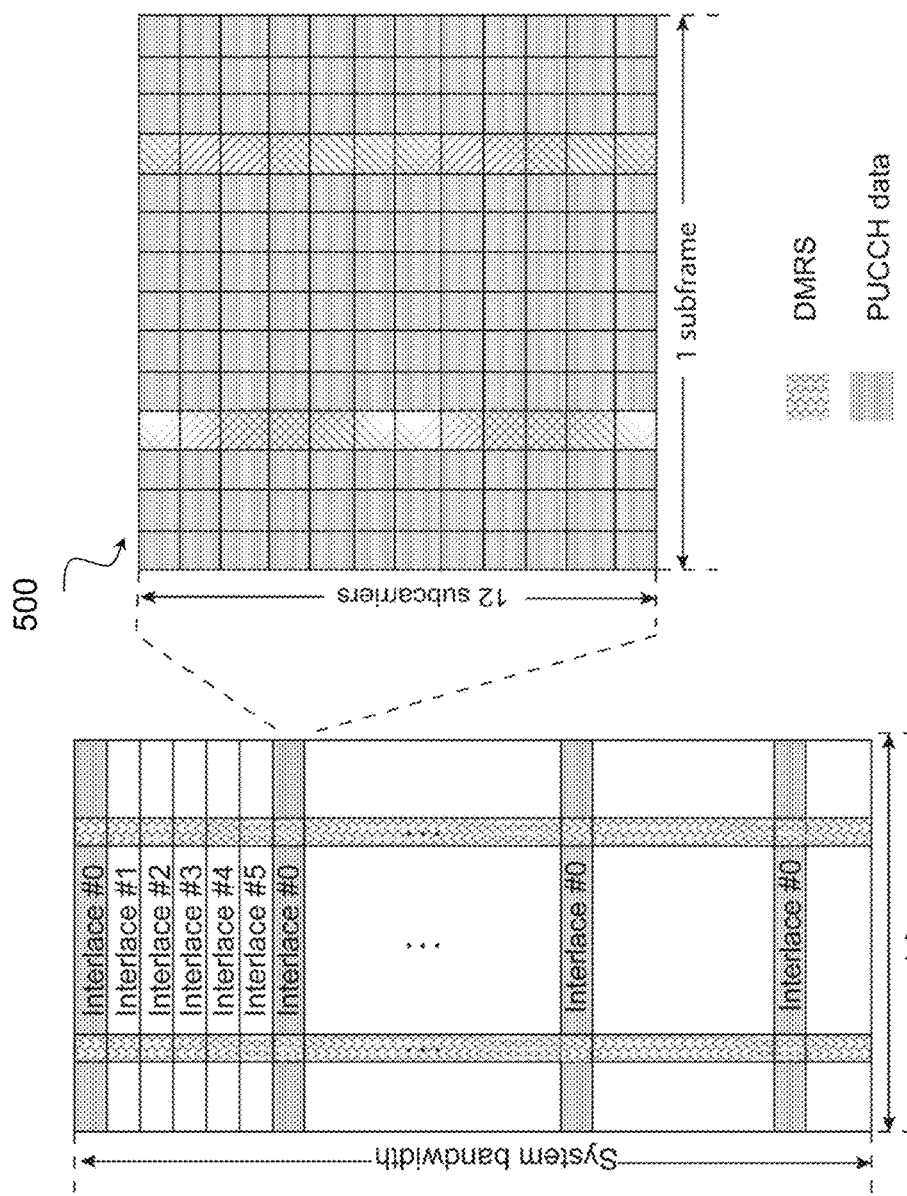
FIG. 13 illustrates an example of a long PUCCH (ePUCCH), in accordance with certain embodiments.

FIG. 13 illustrates an example of a long PUCCH (ePUCCH) 500, in accordance with certain embodiments. A long PUCCH occupies a full subframe in time domain, and spans the whole bandwidth by interlacing. A long PUCCH can be explicitly scheduled by eNB where LBT is required at wireless device 110 to get access to the UL channel. The long PUCCH is compatible and can be multiplexed with PUSCH transmission from the same or different wireless devices 110.

In the example embodiment depicted in FIG. 13, the ePUCCH 500 occupies one interlace in one subframe. There is one DMRS per slot occupying the whole bandwidth in frequency, which can be multiplexed with PUSCH DMRS by applying different cyclic shifts. Similarly to the sPUCCH depicted in FIG. 12, multiple PUCCH wireless devices 110 can be multiplexed in the frequency domain by assigning different interlacing patterns and/or in the code domain by applying, for example, different orthogonal cover codes (OCCs) within a single interlace. The remaining interlaces within the same subframe can be used for PUSCH transmission and PUCCH/PUSCH transmission from other wireless devices. The interlace pattern, CS and OCC configuration (if any) can be configured for a wireless device 110 by eNB signaling.

Similar to sPUCCH, the HARQ feedback and the corresponding process IDs could either be listed explicitly or e.g. be provided as a bitmap (one or two bits per process) on long PUCCH. The UCI on long PUCCH is attached with an 8-bit CRC and encoded using Tail Biting Convolutional Code (TBCC). The encoded symbols are mapped to available REs in a frequency first time second manner.

In 3GPP LTE, the UCI transmission on PUCCH includes HARQ-ACK, SR and periodic CSI. For standalone LTE-U, it would be difficult to support periodic CSI and hence aperiodic CSI feedback is more essential and should be supported on PUSCH scheduled by UL grant with or without UL-SCH data. If more than one UCI type is transmitted on PUCCH, e.g. HARQ and SR in the same subframe, they are concatenated, jointly encoded and sent on either sPUCCH or long PUCCH format according to the eNB configuration based on DL HARQ protocol.

Since Rel-8, the downlink HARQ protocol is asynchronous. Thus, the HARQ feedback (ACK/NACK) can be sent reliably on the PUCCH of a licensed PCell. However, for standalone operation (as well as for LAA with Dual Connectivity) also the UL Control Information (UCI) is transmitted on unlicensed spectrum. Currently, regulatory rules allow for the omission of LBT for control information (not for user plane data) if those transmissions do not occupy the medium for more than 5% in a 50 ms observation window. While it would be attractive from protocol point of view to design the PUCCH based on this rule, the resulting collisions could impact the system performance negatively. Furthermore, there may be attempts to modify or reject the 5% rule. Therefore, applying LBT to control signaling may be appropriate.

As of today, the LTE DL HARQ design relies solely on the fixed timing relation between the DL HARQ process and the corresponding HARQ feedback. Due to LBT, the time between DL transmission and HARQ feedback may vary. Accordingly, it may be appropriate to transmit the HARQ process ID in the HARQ feedback sent in the uplink.

Since any kind of bundling increases the RTT, immediate feedback (in subframe n+4) is generally preferable in terms of e2e latency. However, it may also require network node 116 and wireless device 110 to switch the transmission direction (i.e., from DL to UL or from UL to DL) more frequently which increases overhead. If the HARQ process ID needs to be included in the HARQ feedback anyway, the HARQ feedback for multiple downlink processes may be bundled into a single uplink message.

While immediate feedback per process reduces the latency observed on IP layer, the feedback bundling improves the spectral efficiency. Which of these "modes" is preferable depends e.g. on the system load and on the queue of the particular UE (e.g. TCP slow start vs. congestion avoidance phase). Therefore, network node 115 may have means to toggle dynamically between these modes, i.e., request wireless device 110 to send the HARQ feedback for each process individually or let wireless device 110 bundle feedback for multiple processes.

According to a first proposed embodiment, network node 115 controls whether wireless device 110 sends HARQ feedback immediately (n+4) or delays (and possibly bundles) it until a later point in time. This request could be either explicit as part of the DL assignment or wireless device 110 may determine it based on the availability of appropriate resources for sending UCI. The details may depend also on the PUCCH design(s) which are discussed below.

ACK/NACK feedback may be provisioned for downlink HARQ processes. In principle, it should be possible to transmit HARQ feedback (UCI) in:

1. the same subframe as PUSCH from the same wireless device 110;
2. the same subframe as PUSCH from another wireless device 110;
3. the same subframe as PDSCH for the same wireless device 110;

4. the same subframe as PDSCH for another wireless device 110; and 5. an empty subframe where wireless device 110 did neither receive an UL grant nor detect PDSCH.

Figure 14:
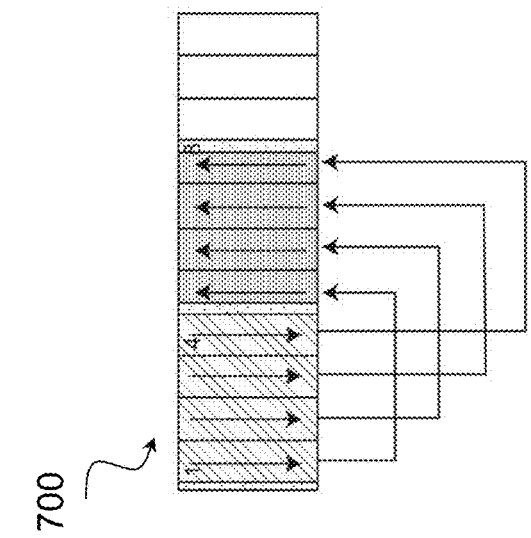
FIG. 14 depicts an example UL control information (UCI) mapped to Physical Uplink Shared Channel (PUSCH) of a same wireless device, in accordance with certain embodiments.

FIG. 14 depicts an example UCI 600 mapped to PUSCH of the same wireless device 110. Specifically, FIG. 11 depicts where wireless device 110 has received downlink data on PDSCH in four consecutive subframes as well as UL grants valid for the four subsequent subframes. Whenever wireless device has already been scheduled on PUSCH, it may be desirable to send the HARQ feedback (if any is available) and other UCI as early as possibly in order to minimize the protocol latency. The UCI 600 should be mapped onto those PUSCH resources to maintain preferable transmission characteristics. In certain embodiments, "PUCCH over PUSCH may be allowed." As such, in response to a valid UL grant, pending HARQ feedback (and possibly other UCI) may be multiplexed onto PUSCH.

Figure 15:
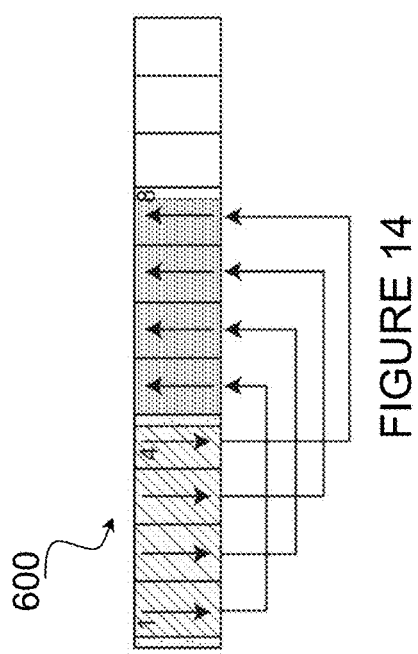
FIG. 15 illustrates an example UCI on ePUCCH together with PUSCH from another wireless device, in accordance with certain embodiments.

FIG. 15 illustrates an example UCI 700 on ePUCCH together with PUSCH from another wireless device 110. Specifically, FIG. 15 depicts a case where the UCI 700 from wireless device 110 having received PDSCH in the first four subframes is mapped to the (long) ePUCCH that spans across all available symbols of the subsequent 4 subframes. The PUSCH resources are assumed to be allocated to another wireless device 110. In certain embodiments, ePUCCH may be multiplexed with PUSCH in the same subframe on different interlaces. Multiple users can be multiplexed on the same ePUCCH interlace.

In the example of FIG. 15, wireless device 110 provides HARQ feedback as early as possible (i.e., n+4) which is desirable in terms of latency. If the subframes are anyway used for PUSCH transmissions of other wireless devices, the additional overhead due to immediate HARQ feedback is negligible. If, however, network node 115 does not need the intermediate subframes, it may be desirable to leave those empty such that they are available for other systems and to let wireless device 110 bundle the HARQ feedback within a single PUCCH transmission. In order to follow the Rel-8 principle and to aim for low protocol latency, it is suggested that wireless device 110 sends by default the HARQ feedback at the earliest point in time where PUCCH resources are available. If the network intends to minimize wireless device power consumption or link occupancy, the network may indicate in the DL assignment that wireless device 110 shall postpone the HARQ feedback until having received another assignment without such indication.

Figure 16:
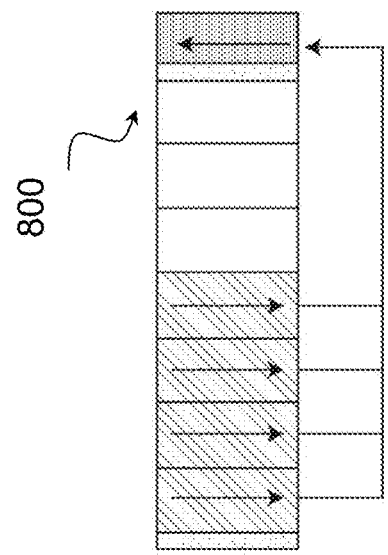
FIG. 16 illustrates a bundled ePUCCH transmission, in accordance with certain embodiments.

FIG. 16 illustrates a bundled ePUCCH transmission 800, in accordance with certain embodiments. Specifically, network node 115 indicates in the first three downlink subframes that wireless device 110 shall defer HARQ feedback. Network node 115 omits this indication in the fourth downlink subframe. Consequently, wireless device 110 omits PUCCH in subframes 5, 6 and 7 and then sends bundled feedback for all 4 HARQ processes in subframe 8.

According to a second proposed embodiment, by default, wireless device 110 may send available HARQ feedback at the earliest point in time where PUCCH resources are available. Note that certain embodiments require wireless device 110 to have HARQ feedback for PDSCH available in n+4.

According to a third proposed embodiment, network node 115 may indicate in a DL assignment that wireless device 110 shall postpone the HARQ feedback corresponding to this HARQ process. Wireless device 110 shall send the HARQ process only upon reception of a subsequent DL assignment without this indication.

User traffic is often downlink-heavy. Hence, there will be occasions in which network node 115 intends to schedule more DL than UL subframes. Spending entire subframes for PUCCH would create an undesirable overhead. Therefore, a short PUCCH (sPUCCH) in addition to the ePUCCH may be supported. This sPUCCH may appear at the end of a shortened downlink (or special) subframe as described above and as shown in FIG. 17. The presence of a shortened downlink subframe may be announced on C-PDCCH and correspondingly the dynamic sPUCCH may be indicated by C-PDCCH.

FIG. 17 illustrates a sPUCCH 900 with continuous PDSCH allocation, in accordance with certain embodiments. As depicted in FIG. 17, wireless device 110 is scheduled for PDSCH continuously. The HARQ feedback for the PDSCH received in subframe 1 could have been transmitted in subframe 5 in accordance with the legacy HARQ timeline. However, in this example, network node 115 used subframe 5 for another PDSCH transmission. As a result, wireless device 110 had to postpone the HARQ feedback in subframe 1, depicted as 902A. The same applies for the HARQ feedback corresponding to subframes 2 and 3, depicted as 902B-C. In subframe 7, the C-PDCCH indicates that the subsequent subframe (subframe 8) will be a shortened subframe 904 and that there will be an sPUCCH occasion. As such, wireless device 110 may send the HARQ feedback corresponding to subframe 1, subframe 2, subframe 3, and subframe 4 at the end of subframe 8. In this example, the indication in the DL assignment for postponing and bundling of the HARQ feedback would not have been necessary.

FIG. 18 illustrates a sPUCCH 1000 where not all subframes are occupied by PDSCH continuously. As depicted, the sPUCCH has empty subframes. A similar scenario is also depicted in FIG. 16, discussed above. In the depicted example, wireless device 110 postpones the HARQ feedback, depicted as 1002A-C. Wireless device 110 may, in certain embodiments, attempt to send its feedback using ePUCCH as soon as possible. To avoid that, network node 115 may instruct wireless device 110 in the DL assignment to postpone the HARQ feedback by indicating that a subsequent subframe will be a shortened subframe 1004 and that there will be an sPUCCH occasion.

According to another proposed embodiment, wireless device 110 sends pending HARQ feedback (and possibly other UCI) on sPUCCH if network node 115 indicates an sPUCCH opportunity using C-PDCCH.

The following discusses several issues related to LBT, including whether and when wireless device 110 should perform LBT prior to or in between UL transmissions.

Previous considerations included that wireless device 110 should perform only a short Clear Channel Assessment (25 μs) prior to a self-scheduled uplink transmission since network node 115 performed LBT with exponential back-off before sending the corresponding scheduling message. Accordingly, wireless device 110 may only verify that the channel is clear (which may in rare occasions not be the case due to "hidden node" effects) but not give others the opportunity to contend for the channel. In the same way as done for PUSCH, it may be possible to perform just a short LBT prior to the transmission of ePUCCH considering that the preceding PDSCH transmission was subject to a regular LBT. In other words, the ePUCCH uses the same LBT parameters as the scheduled PUSCH which allows multiplexing the transmissions in a single subframe.

According to certain other embodiments, wireless device 110 applies the same 25 μs defer-only CCA ("short LBT")

for scheduled PUSCH and ePUCCH which allows multiplexing such transmissions from different wireless devices 110 in a single subframe.

In the example in FIG. 15, the fourth PUCCH transmission by wireless device 110 needs to end early so that network node 115 may perform DL LBT prior to a subsequent DL subframe. This may be achieved by applying a sufficiently long timing advance to the wireless device's uplink transmission. As a consequence, the entire uplink burst may shift towards the left. The shortened DL subframe (SF 4) may avoid overlap of the uplink burst with the preceding downlink burst. With this principle there is actually no need to shorten the uplink subframe itself at the end of the uplink burst (not depicted).

Besides the LBT upon transition from DL to UL and UL to DL, additional LBT phases are needed if different wireless devices 110 provide their PUCCH feedback or PUSCH transmissions in adjacent subframes. In certain embodiments, gaps may be allowed between subsequent UL subframes. FIG. 19 illustrates a transmission scheme 1100 including UCI from two different wireless devices 110 in subsequent subframes, depicted as reference numerals 1102 and 1104 requiring additional LBT phase. Specifically, a first UE receives PDSCH in the first two subframes, depicted with reference numeral 1102, and a second UE receives PDSCH in the third and fourth subframe, depicted with reference numeral 1104. While network node 115 may perform the DL transmissions back-to-back, the second wireless device 110 needs to sense the channel to be empty before performing its PUCCH transmission.

When comparing the examples in FIG. 15 and FIG. 19, it may be seen that a wireless device 110 cannot determine by itself whether to perform LBT prior to an uplink transmission. Even if it did transmit already in the preceding subframe, it may have to do another LBT prior to the subsequent subframe depending on whether or not other wireless devices 110 need to perform LBT in that subframe. Accordingly, in certain embodiments, network node 115 may indicate explicitly in UL grants (for PUSCH) and DL assignments (for PUCCH) whether wireless device 110 may skip LBT for the corresponding UL subframe. To avoid error cases, however, wireless device 110 may perform a short LBT in a scheduled uplink subframe if it had not performed a transmission in the preceding subframe. This mismatch could have occurred due to the wireless device's LBT in the preceding subframe or due to missing an UL grant or DL assignment.

According to still other embodiments, wireless device 110 may skip a short uplink LBT (prior to PUSCH and ePUCCH) if both of the following conditions are fulfilled:
Wireless device 110 performed an UL transmission (PUCCH or PUSCH) in the preceding subframe; and
Network node 115 explicitly permitted skipping LBT in the UL grant or DL assignment.

It may also be noted that in the examples of FIG. 15 and FIG. 19, wireless device 110 does not (need to) know whether its PUCCH transmission coincides with a PUSCH transmission of another wireless device 110. In other words, the cases 2) and 5) in the list above are equivalent from the viewpoint of the wireless device 110 transmitting the PUCCH.

In certain embodiments, network node 115 may perform DL LBT prior to the start of a DL subframe. The network node 115 may shorten the last PDSCH subframe of a DL burst to make room for a subsequent LBT. Similarly, the last UL transmission (PUSCH or PUCCH) of a wireless device 110 may be shortened if another uplink transmission is supposed to follow.

In such scenarios, wireless device 110 may also perform UL LBT prior to the UL subframe. However, such an approach has drawbacks. For example, network node 115 may be required to decide whether the subsequent subframe will also be allocated to the same wireless device 110. If so, the current subframe can span across all symbols; if not, the current subframe has to be shortened. Such "look-ahead" is processing heavy and increases the scheduling delay since it requires performing the uplink scheduling not only for subframe n+4 but also for n+5. Additionally, it is desirable that network node 115 have the ability to win LBT against one of the wireless devices 110 that intend to transmit PUCCH. As such, it may be desirable to perform UL LBT at the beginning of an UL subframe rather than at the end of the preceding subframe. As such, in certain embodiments, wireless device 110 may perform UL LBT at the beginning of the UL subframe rather than at the end of the preceding subframe. Following the principle of acknowledgements in Wi-Fi, wireless device 110 does not need to perform any LBT prior to the sPUCCH transmission because network node 115 performed LBT at the beginning of the preceding DL burst.

The "need for a gap between sPUCCH and PUSCH" is yet unresolved. According to certain embodiments, however, wireless device 110 perform a short LBT prior to its PUSCH subframe if it did not send sPUCCH in the preceding subframe. In a particular embodiment, for example, wireless device 110 may apply a 25 µs defer-only short LBT prior to transmission of sPUCCH. This scenario fits well with a situation where UL LBT is performed in the beginning of the UL subframe.

According to certain other embodiments, wireless device 110 may skip the short uplink LBT between sPUCCH and the subsequent PUSCH/ePUCCH if both of the following conditions are fulfilled:
Wireless device 110 performed an UL transmission (sPUCCH) in the preceding subframe; and
Network node 115 explicitly permitted skipping LBT in the UL grant or DL assignment.

If network node 115 intends to continue with a PDSCH transmission after the sPUCCH, network node 115 may do so after a short gap if that PDSCH belongs still to the same TxOP. Otherwise, network node 115 performs LBT including exponential back-off.

In LTE, network node 115 may configure a wireless device 110 that is RRC Connected with a Dedicated Scheduling Request (D-SR) resource on PUCCH. The periodicity (e.g. 2, 4, 10, 20 subframes) as well as the actual time/frequency resource may be configured semi-statically via RRC. Upon arrival of data (IP packets) from higher layer into the wireless devices 110 empty PDCP queue, a Buffer Status Report is triggered. If wireless device 110 does not have a valid uplink grant for sending the BSR, wireless device 110 sends a D-SR at its next D-SR occasion using the D-SR resource. The same principle could also be applied for standalone LTE in the unlicensed bands. However, it may be assumed that wireless device 110 performs LBT prior to the transmission of the D-SR on PUCCH.

Figure 20:
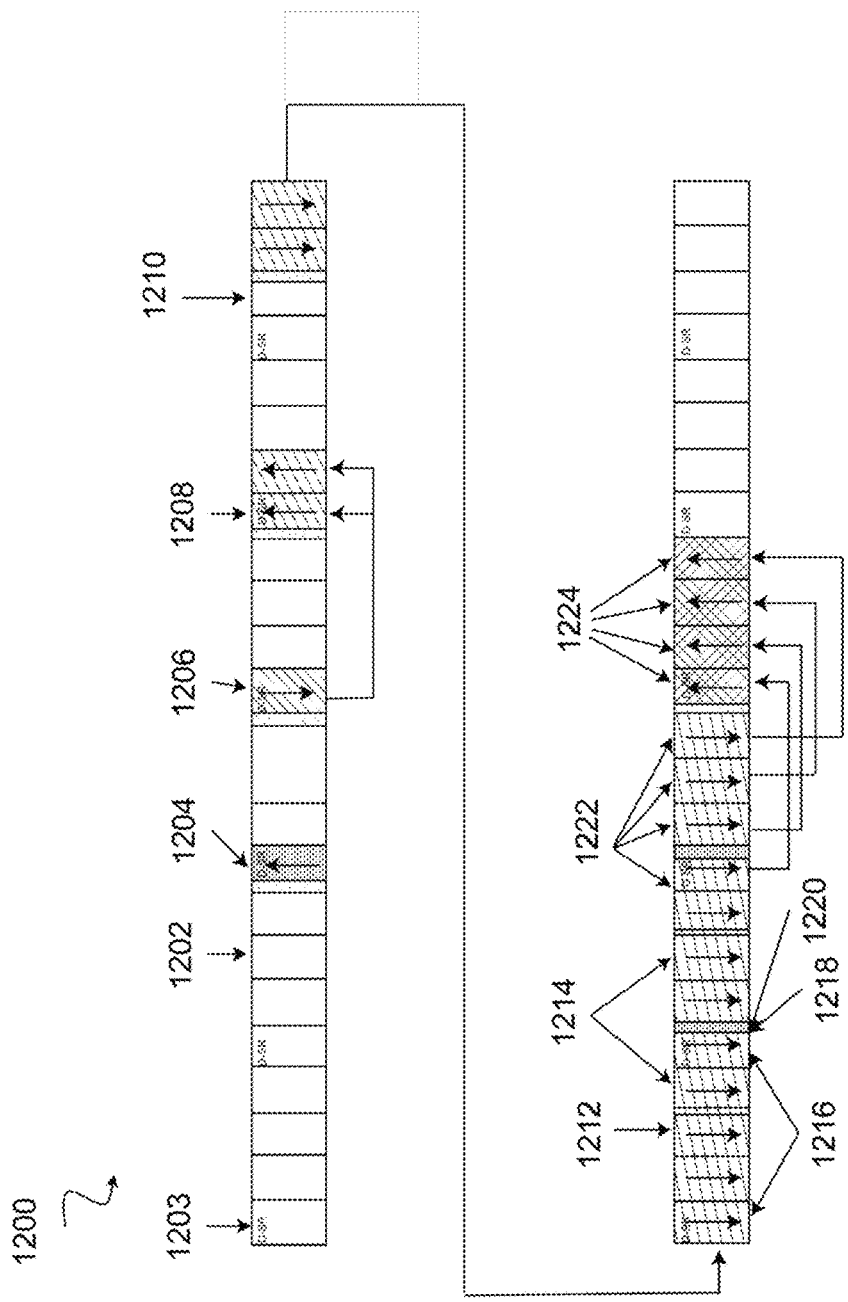
FIG. 20 illustrates a Dedicated Scheduling Request (D-SR) on sPUCCH, in accordance with certain embodiments.

FIG. 20 illustrates a transmission scheme 1200 for transmitting a D-SR on sPUCCH. Specifically, FIG. 20 depicts an example scenario where wireless device 110 receives UL data 1202 and is configured with a D-SR opportunity in every $4^{th}$ subframe. For example, the first subframe 1203 includes an unused D-SR opportunity for the wireless device 110 and possibly other wireless devices 110 too. At times when no wireless devices 110 connected with network node 115 is actively transmitting or receiving data, network node 115 minimizes downlink transmissions (DRS only) and most subframes will be empty. As depicted, network node 115 sends bundled uplink grants 1206. Wireless device 110 attempts to send a D-SR 1204 in the third depicted D-SR occurrence and succeeds in transmitting a PUSCH after successful LBT 1208 in the beginning of the subframe.

Once the channel is occupied by UL or DL data transmissions (such as transmissions 1210 and 1212, LBT prior to D-SR by wireless device 110 is likely to fail due to ongoing PDSCH/PUSCH data bursts. However, what might appear as a problem at a first glance may be considered a desirable property. For example, by using a more aggressive LBT configuration (still fair to Wi-Fi) than connected wireless devices 110, network node 115 can grab the channel and schedule PDSCH/PUSCH efficiently as soon as data becomes available. To ensure that wireless devices 110 are able to inform network node 115 about available data, network node 115 may declare at least some of the wireless devices' D-SR occasions as shortened DL subframes 1214 or leave them empty. As shown in the latter part of the sequence in FIG. 20, wireless devices 110 will use those occasions for sending D-SR and HARQ feedback. Specifically, in the depicted example embodiment, network node 115 requests HARQ feedback to be sent in a corresponding subframe, shown at reference numeral 1216. Wireless device 110 sends D-SR 1218 and HARQ Feedback 1220 on sPUCCH. Network node 115 sends UL grants 1222. Wireless device 110 sends data and HARQ feedback 1224 on PUSCH.

According to certain particular embodiments, network node 115 may configure wireless device 110 with D-SR resources using RRC signaling. Wireless device 110 may send D-SR in the RRC-configured occasions on ePUCCH after successful short LBT. Alternatively, wireless device 110 may send D-SR in those occasions on sPUCCH if network node 115 announces the subframe to be a shortened DL subframe.

While there may be a need to multiplex HARQ feedback onto the wireless device's PUSCH resources, there is no need to do that with D-SR. The reason is that a wireless device 110 having a valid uplink grant will rather include a (more detailed) buffer status report inside the MAC PDU sent on PUSCH.

In addition to HARQ feedback and D-SR, PUCCH may also carry the channel state information (CSI). In LTE, CSI can be mapped to PUCCH as well as to PUSCH. In certain embodiments, aperiodic CSI reporting may be most essential. Like in LTE, the aperiodic CSI is mapped to PUSCH (possibly without UL user data). Such principles may also be followed for unlicensed standalone LTE.

In a particular embodiment, only aperiodic CSI feedback may be supported. The aperiodic CSI feedback may be mapped to PUSCH in accordance with the UL grant provided by network node 115.

In certain embodiments, each UL serving cell may carry the HARQ feedback for the corresponding DL serving cell. This may be contrasted with LTE where typically the PUCCH of the PCell carries the UCI for all SCells but in terms of channel utilization and PUCCH format design we suggest to keep it separate in LTE unlicensed standalone. Accordingly, in a particular embodiment, each UL serving cell may carry the HARQ feedback for the corresponding DL serving cell.

In certain embodiments, there may not be a strong need to support a mode of operation with more downlink than uplink serving cells. In other words, wireless devices 110 may always support as many uplink as downlink carriers in Standalone LTE-U. This would follow the principles applied in Wi-Fi carrier bundling and may ease the definition of feedback formats. Accordingly, in a particular embodiment, multiplexing of feedback from multiple downlink serving cells onto a common uplink serving cell may not be supported. Specifically, wireless device 110 may always support as many uplink as downlink carriers in Standalone LTE-U.

In certain embodiments, wireless device 110 may determine the ePUCCH and sPUCCH resources to use. One possibility is that wireless device 110 derives them implicitly from the DL grants by similar mappings as defined in LTE. However, since network node 115 schedules the corresponding PDSCH transmission explicitly and the format of the ePUCCH is similar to that of the PUSCH, network node 115 may also grant the ePUCCH resources more explicitly. The transmission resources of ePUCCH may be selected according to L1 characteristics and the various UCI types.

Figure 21:
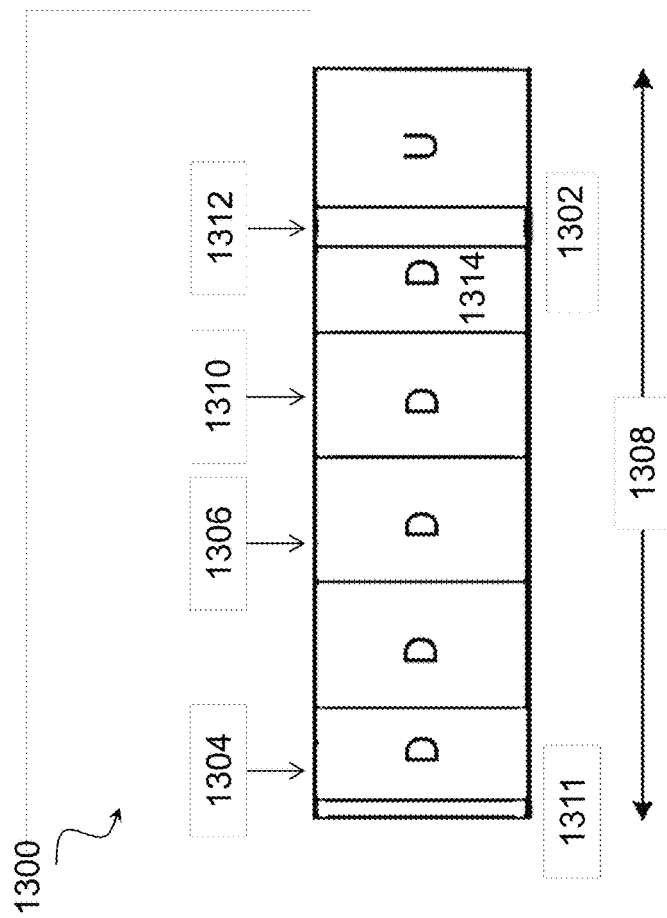
FIG. 21 illustrates an example method for deferring periodic SR transmissions by a wireless device, in accordance with certain embodiments.

FIG. 21 illustrates a transmission scheme 1300 for deferring periodic SR transmissions by wireless devices 110 until an sPUCCH occurrence 1302, according to certain embodiments. A dynamic sPUCCH may be signaled by CPDDCH. In certain embodiments, the dynamic sPUCCH 1302 may be the last n (to be chosen between 1 and 4) symbols of a subframe where the first 14-n symbols are not used for UL transmission.

In certain embodiments, wireless devices 110 associated with a cell may be configured with periodic SR transmissions using higher layer signaling. For example, as depicted wireless device 110A may be configured with periodic SR transmissions in the first subframe 1304 and the third subframe 1306 of transmission opportunity 1308. A second wireless device 110B may be configured for periodic SR transmission in the fourth subframe 1310. These SR opportunities associated with subframes 1304, 1306, and 1310 may be blocked if the network node 115 performs LBT procedure 1311 and allocates DL transmissions on the corresponding subframes. Accordingly, where wireless devices 110A and 110B are not scheduled for PUSCH, wireless devices 110A and 110B are unable to transmit SRs during the subframes 1304, 1306, and 1310 of transmission opportunity 1308. Their SR transmissions are then deferred until the first UL transmission opportunity, which in this case is sPUCCH 1302, which is depicted as the subframe following a partial DL subframe 1314 in fifth subframe 1312. The occurrence of the sPUCCH 1302 is implicitly indicated by the eNB using common PDCCH signaling to indicate the presence of partial DL subframe 1314. In certain embodiments, partial DL subframe 1314 may be equivalent to DwPTS. These SR transmissions can coincide with transmissions by other wireless devices 110 during the sPUCCH 1302, such as HARQ ACK/NACK feedback associated with the first DL subframe 1304. The sPUCCH 1302 duration may be between one to four symbols in the time domain, for example.

As used herein, a partial DL subframe refers to a DL subframe in which fewer than the full number of symbols are used for transmission. Thus, where a DL subframe is comprised of fourteen symbols, a partial DL subframe may be a subframe wherein less than all of the fourteen symbols is used. As such, the terms shortened subframe, partial subframe, partial DL subframe, shortened TTI, partial TTI, and partial DL TTI may be used interchangeably herein.

According to certain embodiments, the SR transmissions deferred to the sPUCCH 1302 need to be configured with appropriate transmission resources, including one or more of UL interlace, orthogonal cover code, and cyclic shift. An example of an UL interlace is a set of 10 resource blocks that are equally spaced in frequency and span the entire system bandwidth.

According to certain embodiments, wireless device 110 may be configured with two or more sets of PUCCH resources for SR transmission. One set is used when the periodic SR transmission opportunity is utilized. One of the additional sets is used when the SR transmission opportunity is deferred to the first available sPUCCH or ePUCCH. A cell-specific signal may be included in the common PDCCH or another control signal to dynamically indicate which of the additional sets should be utilized within a particular TXOP, when a DL-heavy TXOP allocation is signaled by the eNB. The eNB can utilize its knowledge of the expected ACK/NACK load in the sPUCCH to optimally select or configure the additional PUCCH resource set.

Figure 22:
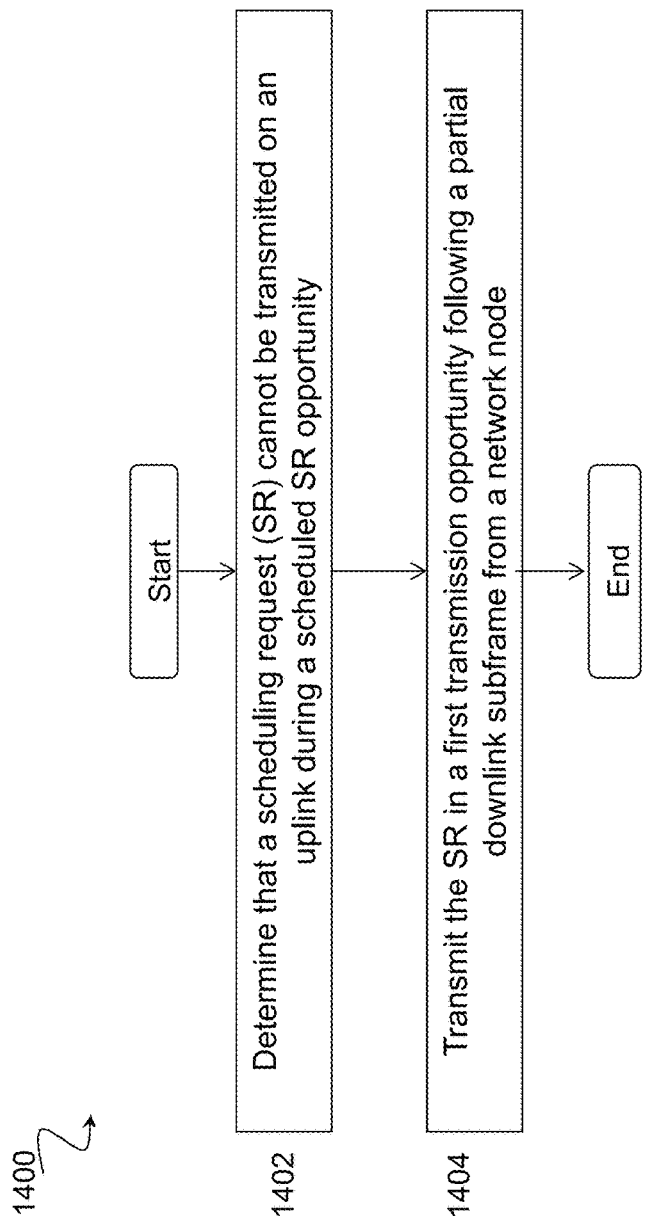
FIG. 22 illustrates an example method by a wireless device for multiplexing SRs in unlicensed bands, in accordance with certain embodiments.

FIG. 22 illustrates an example method 1400 by a wireless device 110 for multiplexing SRs in unlicensed bands, in accordance with certain embodiments. The method begins at step 1402 when wireless device 110 determines that an SR cannot be transmitted on an uplink during a scheduled SR opportunity. For example, returning to FIG. 21, wireless device 110 may determine that wireless device 110 cannot transmit SR during the first subframe 1304 when wireless device 110 detects a DL transmission from network node 115 in first subframe 1304.

At step 1404, wireless device 110 transmits the SR in a first transmission opportunity following a partial downlink (DL) subframe, which may also be referred to as a partial transmission time interval (TTI), from network node 115. Returning to FIG. 21, for example, wireless device 110 may transmit the SR in the fifth subframe following partial DL subframe 1314. In a particular embodiment, the first transmission opportunity following the partial DL subframe 1314 is a sPUCCH following the partial DL subframe 1314. In a particular embodiment, the duration of the sPUCCH may be between one and four symbols in the time domain.

In certain embodiments, wireless device 110 may receive signaling from network node 115 that indicates the presence of the partial DL subframe. In a particular embodiment, for example, the signaling may include PDCCH signaling. Additionally or alternatively, wireless device 110 may receive configuration information identifying transmission resources to be used for transmitting the SR. For example, the configuration information may include an UL interlace, orthogonal cover code, and/or cyclic shift to be used for transmitting SR.

In certain embodiments, the SR may be transmitted at step 1404 concurrently (e.g., together with) with at least one additional transmission by another wireless device 110. For example, the SR may be transmitted concurrently with ACK/NACK feedback associated with the partial DL subframe 1314.

Figure 23:
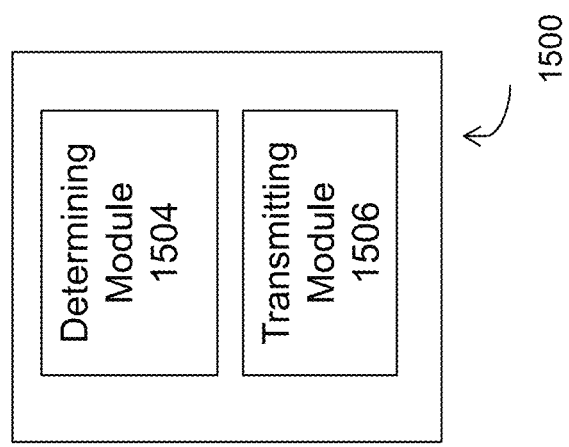
FIG. 23 illustrates an example virtual computing device for multiplexing SRs in unlicensed bands, in accordance with certain embodiments.

In certain embodiments, the methods for multiplexing SRs in unlicensed bands as described in FIG. 22 may be performed by one or more virtual computing devices. FIG. 23 illustrates an example virtual computing device 1500 for multiplexing SRs in unlicensed bands, according to certain embodiments. In certain embodiments, virtual computing device 1500 may include modules for performing steps similar to those described above with regard to the method illustrated and described in FIG. 22. For example, virtual computing device 1500 may include at least one determining module 1502, at least one transmitting module 1504, and any other suitable modules for multiplexing SRs in unlicensed bands. In some embodiments, one or more of the modules may be implemented using one or more processors 320 of FIG. 11. In certain embodiments, the functions of two or more of the various modules may be combined into a single module.

The determining module 1502 may perform the determining functions of virtual computing device 1500. For example, in a particular embodiment, determining module 1502 may determine that an SR cannot be transmitted on an uplink during a scheduled SR opportunity. For example, determining module 1502 may determine that the SR cannot be transmitted in response to detecting a DL transmission from a network node 115.

The transmitting module 1504 may perform the transmitting functions of virtual computing device 1500. For example, transmitting module 1504 may transmit the SR in a first transmission opportunity following a partial DL subframe from network node 115. In a particular embodiment, transmitting module 1504 may transmit the SR on sPUCCH following the partial DL subframe.

Other embodiments of computer networking virtual apparatus 1500 may include additional components beyond those shown in FIG. 23 that may be responsible for providing certain aspects of the wireless device's 110 functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 24:
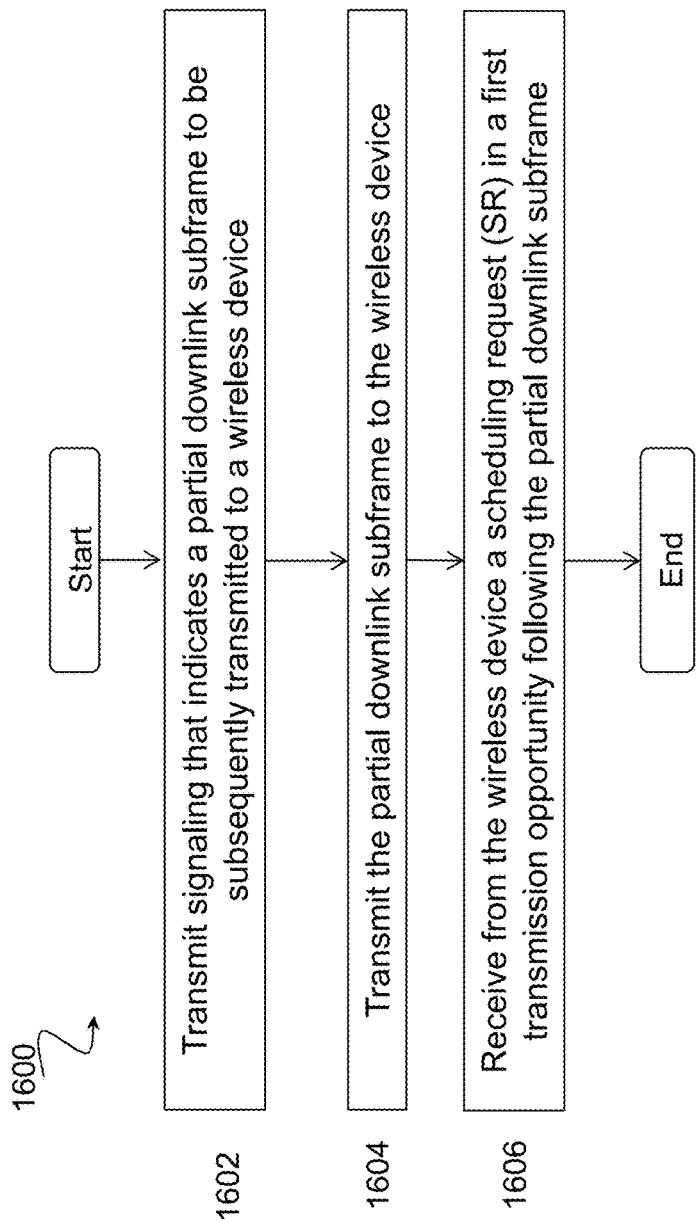
FIG. 24 an example method by a network node for multiplexing SRs in unlicensed bands, in accordance with certain embodiments.

FIG. 24 illustrates an example method 1600 by a network node 115 for multiplexing SRs in unlicensed bands, in accordance with certain embodiments. The method begins at step 1602 when network node 115 transmits signaling that indicates a partial DL subframe, which may also be referred to as a partial DL TTI, is to be subsequently transmitted to a wireless device 110. In a particular embodiment, for example, the signaling may include PDCCH signaling. Additionally or alternatively, network node 115 may transmit configuration information identifying transmission resources to be used for transmitting the SR. For example, the configuration information may include an UL interlace, an orthogonal cover code, and/or a cyclic shift to be used for transmitting SR.

At step 1604, network node 115 transmits the partial downlink subframe to the wireless device 110.

At step 1606, network node 115 receives from the wireless device 110 a scheduling request (SR) in a first transmission opportunity following the partial DL subframe, which may also be referred to as a partial DL subframe. Returning to FIG. 21, for example, network node 115 may receive the SR in the fifth subframe following partial TTI 1314. In a particular embodiment, the first transmission opportunity following the partial DL subframe 1314 is a sPUCCH following the partial DL subframe 1314. In a particular embodiment, the duration of the sPUCCH may be between one and four symbols in the time domain.

In certain embodiments, the SR may be received concurrently with (e.g., together with) at least one additional transmission by another wireless device 110. For example, the SR may be received concurrently with ACK/NACK feedback associated with the partial DL subframe 1314.

Figure 25:
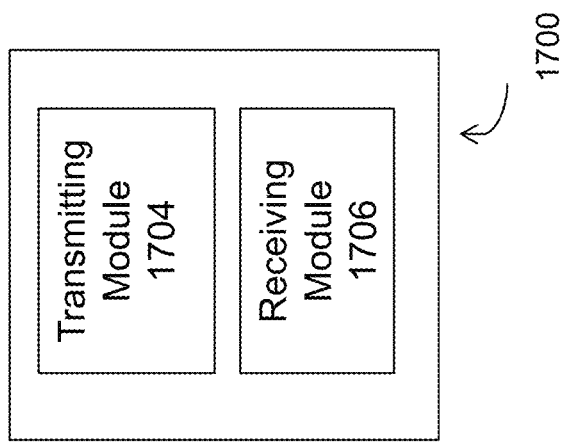
FIG. 25 illustrates another example virtual computing device for multiplexing SRs in unlicensed bands, in accordance with certain embodiments.

In certain embodiments, the methods for multiplexing SRs in unlicensed bands as described in FIG. 24 may be performed by one or more virtual computing devices. FIG. 25 illustrates an example virtual computing device 1700 for multiplexing SRs in unlicensed bands, according to certain embodiments. In certain embodiments, virtual computing device 1700 may include modules for performing steps similar to those described above with regard to the method illustrated and described in FIG. 24. For example, virtual computing device 1700 may include at least one transmitting module 1702, at least one receiving module 1704, and any other suitable modules for multiplexing SRs in unlicensed bands. In some embodiments, one or more of the modules may be implemented using one or more processors 220 of FIG. 10. In certain embodiments, the functions of two or more of the various modules may be combined into a single module.

The transmitting module 1702 may perform the transmitting functions of virtual computing device 1700. For example, in a particular embodiment, transmitting module 1702 may transmit signaling that indicates a partial downlink Transmission Time Interval (DL TTI) to be subsequently transmitted to a wireless device 110. In a particular embodiment, for example, the signaling may include PDCCH signaling. As another example, in a particular embodiment, transmitting module 1704 may transmit the partial DL subframe to the wireless device 110.

The receiving module 1704 may perform the receiving functions of virtual computing device 1700. For example, receiving module 1704 receives, from the wireless device 110, a scheduling request (SR) in a first transmission opportunity following the partial DL subframe, which may also be referred to as a partial TTI.

Other embodiments of computer networking virtual apparatus 1700 may include additional components beyond those shown in FIG. 25 that may be responsible for providing certain aspects of the network node's 115 functionality, including any of the functionality described above and/or any additional functionality (including any functionality necessary to support the solutions described above). The various different types of network nodes 115 may include components having the same physical hardware but configured (e.g., via programming) to support different radio access technologies, or may represent partly or entirely different physical components.

According to certain other example embodiments, wireless device 110 may determine which set of PUCCH resources to use for SR transmission in the sPUCCH after the DL TTI. Specifically, wireless device 110 may take the number of subframes from the wireless device's most recent periodic SR opportunity to the sPUCCH/ePUCCH following the DL TTI into account. According to various embodiments, sPUCCH opportunities may or may not be periodic.

FIGS. 26A-26D illustrate a method for determining, by a wireless device 110, the set of PUCCH resources to use for deferred scheduling request transmissions. Specifically, four different cases exemplify how a wireless device 110 may determine the set of PUCCH resources for SR transmission.

Figure 26A:
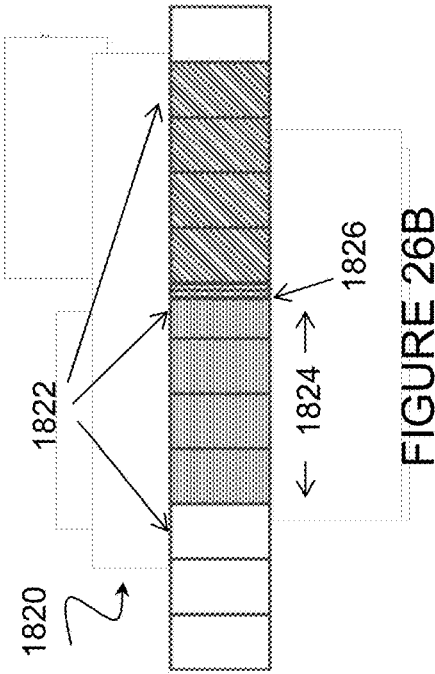
FIGS. 26A-26D illustrate example methods for determining Physical Uplink Control Channel (PUCCH) resources for SR transmission, in accordance with certain embodiments.

FIG. 26A depicts a scenario 1800 wherein a wireless device 110 may use a first set of PUCCH resources if a periodic SR occasion coincides with an UL subframe. Specifically, FIG. 26A depicts that wireless device 110 is configured with periodic D-SR opportunities 1802. In a particular embodiment, the configuration of the periodic D-SR opportunities 1802 may be received via RRC signaling. As depicted, at least the first of the D-SR opportunities 1802 is blocked by a burst of downlink transmissions 1804. Wireless device 110 transmits the SR on PUCCH in the first configured periodic D-SR opportunity 1802 after a shortened DL subframe 1806 with UL sPUCCH in the last symbols.

Figure 26B:
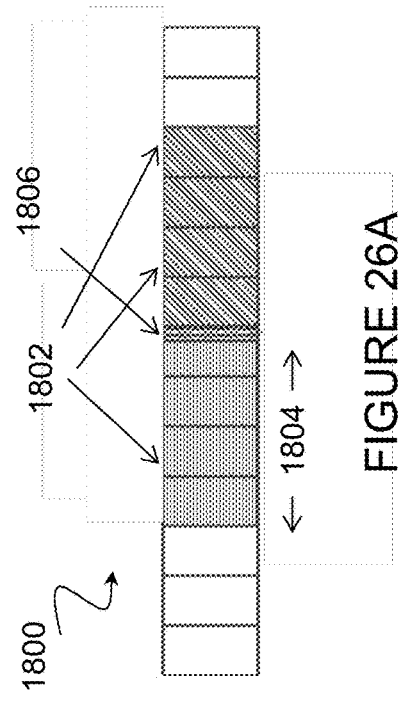

FIG. 26B depicts a scenario 1820 wherein a wireless device 110 may use a second set of PUCCH resources if a periodic SR occasion coincides with a special subframe at the end of the DL TxOP. Specifically, wireless device 110 is configured with periodic D-SR opportunities 1822. In a particular embodiment, the configuration of the periodic D-SR opportunities 1822 may be received via RRC signaling. As depicted, the second of the D-SR opportunities 1822 is blocked by a burst of downlink transmissions 1824. Wireless device 110 transmits the SR on sPUCCH in the first configured periodic D-SR opportunity 1802 after a shortened DL subframe 1826 with UL sPUCCH in the last symbols.

Figure 26C:
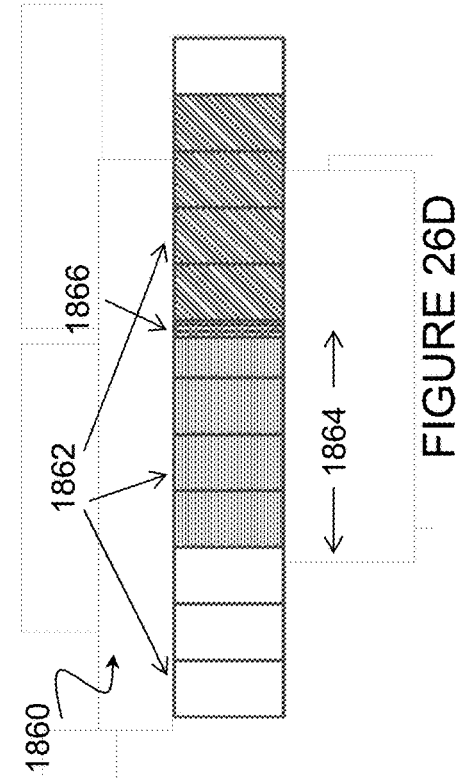

FIG. 26C depicts a scenario 1840 wherein wireless device 110 may use a third set of PUCCH resources if a periodic SR occasion occurred in the subframe preceding the shortened subframe at the end of the DL TxOP. Specifically, wireless device 110 is configured with periodic D-SR opportunities 1842. The second of the D-SR opportunities 1842 is blocked by a burst of downlink transmissions 1844. The second of the D-SR opportunities corresponds with the subframe immediately preceding the shortened subframe 1846, which may also be referred to as a partial DL subframe or partial DL TTI, at the end of the DL TxOP. According to certain embodiments, the second of the D-SR opportunities 1842 is postponed and transmitted on the sPUCCH in the next subframe following the partial DL subframe 1846 with UP sPUCCH in the last symbols.

Figure 26D:
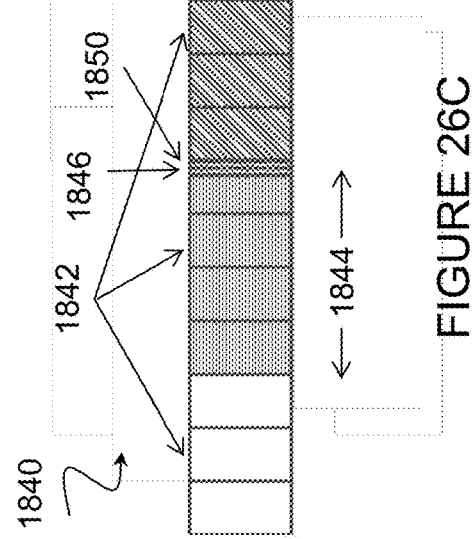

FIG. 26D depicts a scenario wherein a wireless device 110 may use a fourth set of PUCCH resources if a periodic SR occasion occurred two subframes prior to the special subframe at the end of the DL TxOP. Specifically, wireless device 110 is configured with periodic D-SR opportunities 1862. The second of the D-SR opportunities 1862 is blocked by a burst of downlink transmissions 1864. The second of the D-SR opportunities 1862 corresponds to the subframe that is two subframes preceding the shortened subframe (i.e., partial DL subframe, which may also be referred to as a partial DL TTI) 1866 at the end of the DL TxOP. According to certain embodiments, the second of the D-SR opportunities 1862 is postponed and transmitted on the sPUCCH in the next subframe following the partial DL subframe 1866 with UP sPUCCH in the last symbols.

In certain embodiments, the special subframe may include the partial DL subframe, which may also be termed a partial DL subframe. Uplink control information can be carried in the UpPTS portion of the special subframe.

In a particular exemplary embodiment, wireless device 110 uses the PUCCH resource in an interlace of the sPUCCH region based on the number of subframes from the wireless device's 110 most recent periodic SR opportunity. In another embodiment, wireless device 110 may use a PUCCH resource given by x+SN mod M, where x is the PUCCH resource index number assigned to wireless device 110 for the wireless device's 110 most recent periodic SR opportunity subframe; S is the number of subframes from the wireless device's 110 most recent periodic SR opportunity; and N and M are positive integers with M>N, where M represent the available number of PUCCH resources in the sPUCCH region and N may represent the available number of PUCCH resources in a periodic SR opportunity subframe.

In certain embodiments, such as those described above, the two or more sets of PUCCH resources for SR transmission may be configured for the UE using RRC signaling. Wireless device 110 may then determine which one of the two or more sets of PUCCH resources to use.

In certain embodiments, any two of the two or more sets of PUCCH resources may differ from each other in at least one of the UL interlace, the orthogonal cover code or the cyclic shift. For example, the sets of resources determined by wireless device 110 in the cases of FIGS. 26A and 26B may comprise a common interlace of UL PRBs but different orthogonal cover code. Furthermore, the sets of resources determined by wireless device 110 in the cases of FIGS. 26C and 26D may include a common interlace of UL PRBs (different from the interlace used in FIGS. 26A and 26B) but different orthogonal cover code as shown in Table 2.

TABLE 2

Exemplary Use of PRB interlaces and OCCs to sets of resources

| | | Orthogonal Cover Code | |
|---|---|---|---|
| | | OCC 1 | OCC 2 |
| PRB Interlace | Interlace 1 | FIG. 26a | FIG. 26b |
| | Interlace 2 | FIG. 26c | FIG. 26d |

Figure 27:
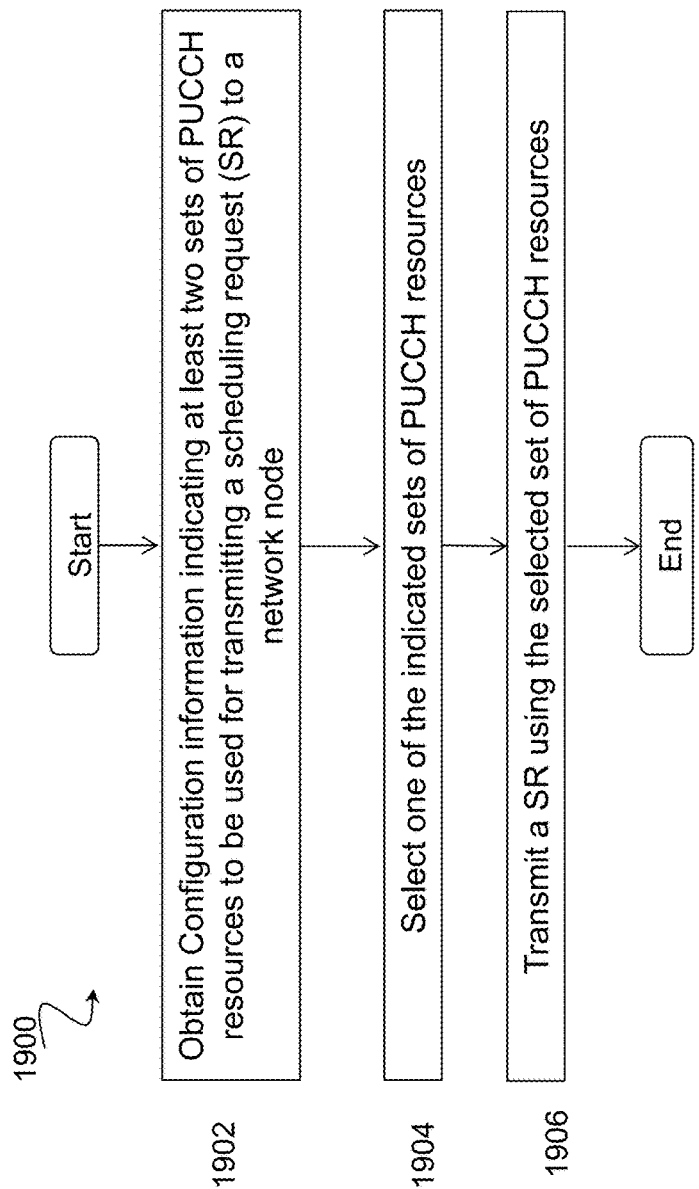
FIG. 27 illustrates another example method by a wireless device for multiplexing SRs in unlicensed bands, in accordance with certain embodiments.

FIG. 27 illustrates another example method 1900 by a wireless device for multiplexing SRs on unlicensed bands, according to certain embodiments. The method begins at step 1902 when the wireless device 110 obtains configuration information indicating at least two sets of PUCCH resources to be used for transmitting a scheduling request (SR) to a network node 115. In certain embodiments, the at least two sets of PUCCH resources are located in one radio frame, such as one 3GPP LTE radio frame. In certain other embodiments, the at least two sets of PUCCH resources are located in different subframes of one radio frame.

In a particular embodiment, the at least two sets of PUCCH resources may include a main set of PUCCH resources that wireless device 110 and at least one additional set of PUCCH resources. Wireless device 110 may be configured to select the main set in response to non-fulfilment of a specific scheduling condition and the at least one additional set in response to fulfilment of the specific scheduling condition. In particular embodiments, the main set of resources may include a periodic SR transmission opportunity. In particular embodiments, the main set of PUCCH resources may be received separately from other configuration information, whereas the at least one additional set of PUCCH resources is indicated with the configuration information. In still other embodiments, the at least one additional set of PUCCH resources may be indicated implicitly by received PDCCH signaling. For example, a cell-specific signal may be received within a common PDCCH or within another control signal and may indicate one of the additional sets of PUCCH resources to be selected.

At step 1904, wireless device 110 selects one of the indicated sets of PUCCH resources. In a particular embodiment, the selecting may be governed by a predefined selection rule dependent on a time duration separating a most recent periodic SR transmission opportunity of the wireless device and a subframe containing the additional sets of PUCCH resources.

In certain embodiments, at least two specific scheduling conditions are associated with respective additional sets of PUCCH resources. Selecting the PUCCH resources to use may include ascertaining whether one of the at least two specific scheduling conditions is fulfilled. In particular embodiments, the at least two specific scheduling conditions may be one of a coincidence of a periodic SR transmission opportunity and an uplink subframe, a coincidence of a periodic SR transmission opportunity and a special subframe at the end of a downlink transmission opportunity, a coincidence of a periodic SR transmission opportunity and subframe immediately preceding a special subframe at the end of a downlink transmission opportunity; and a coincidence of a periodic SR transmission opportunity and a subframe located two subframes prior to a special subframe at the end of a downlink transmission opportunity. In a particular embodiment, the special subframe may be composed of a partial subframe for downlink transmission and a remainder for uplink control data.

In certain embodiments, the configuration information may indicate at least two additional sets of PUCCH resources located in different subframes. Selecting the PUCCH resources to use may include ascertaining availability of an additional set of PUCCH resources located in an earliest subframe. If the additional set of PUCCH resources in the earliest subframe is available for transmission by the wireless devices, wireless device 110 may select this set of PUCCH resources. Conversely, if the additional set of PUCCH resources in the earliest subframe is not available, availability of an additional set of PUCCH resources located in the earliest subsequent subframe may be ascertained.

In certain embodiments, selecting the set of PUCCH resources may include ascertaining availability of one of the at least two sets of PUCCH resources by performing at least one of sensing an uplink grant to a different wireless device and performing channel sensing, such as by executing a listen-before-talk method.

In certain embodiments, selecting the PUCCH resources may be governed by a predefined selection rule having as input a time duration separating a most recent periodic SR transmission opportunity of the wireless device and a subframe containing the additional sets of PUCCH resources, and having as output an interlace index referring to an interlace within a predetermined resource region (sPUCCH). In other embodiments, selecting the set of PUCCH resources may be governed by a predefined selection rule having as input at least one of an index x of the PUCCH resource assigned to the wireless device at its most recent periodic SR transmission opportunity, a number S of subframes elapsed since a most recent periodic SR transmission opportunity of the wireless device, a number M of available PUCCH resources in a predetermined resource region (sPUCCH), and a number N<M of available PUCCH resources in a periodic SR transmission opportunity subframe. An index (x+SN mod M) of a PUCCH resource may be output for selection.

At step 1906, wireless device 110 then transmits a SR using the selected set of PUCCH requests.

Figure 28:
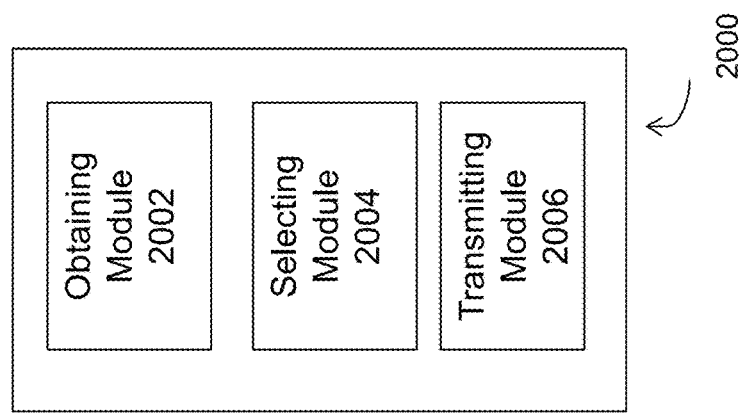
FIG. 28 illustrates another example virtual computing device for multiplexing SRs in unlicensed bands, according to certain embodiments.

In certain embodiments, the methods for multiplexing SRs in unlicensed bands as described in FIG. 27 may be performed by one or more virtual computing devices. FIG. 28 illustrates another example virtual computing device 2000 for multiplexing SRs in unlicensed bands, according to certain embodiments. In certain embodiments, virtual computing device 2000 may include modules for performing steps similar to those described above with regard to the method illustrated and described in FIG. 27. For example, virtual computing device 2000 may include at least one obtaining module 2002, at least one selecting module 2004, at least one transmitting module 2006, and any other suitable modules for multiplexing SRs in unlicensed bands. In some embodiments, one or more of the modules may be implemented using one or more processors 320 of FIG. 11. In certain embodiments, the functions of two or more of the various modules may be combined into a single module.

The obtaining module 2002 may perform the obtaining functions of virtual computing device 2000. For example, in a particular embodiment, obtaining module 2002 may obtain configuration information indicating at least two sets of PUCCH resources to be used for transmitting a scheduling request (SR) to a network node 115.

The selecting module 2004 may perform the selecting functions of virtual computing device 2000. For example, selecting module 2004 may select one of the indicated sets of PUCCH resources. In a particular embodiment, the selecting may be governed by a predefined selection rule dependent on a time duration separating a most recent periodic SR transmission opportunity of the wireless device and a subframe containing the additional sets of PUCCH resources.

The transmitting module 2006 may perform the selecting functions of virtual computing device 2000. For example, transmitting module 2006 may transmit a SR using the selected set of PUCCH requests.

Other embodiments of computer networking virtual apparatus 2000 may include additional components beyond those shown in FIG. 28 that may be responsible for providing certain aspects of the wireless device's 110 functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 29:
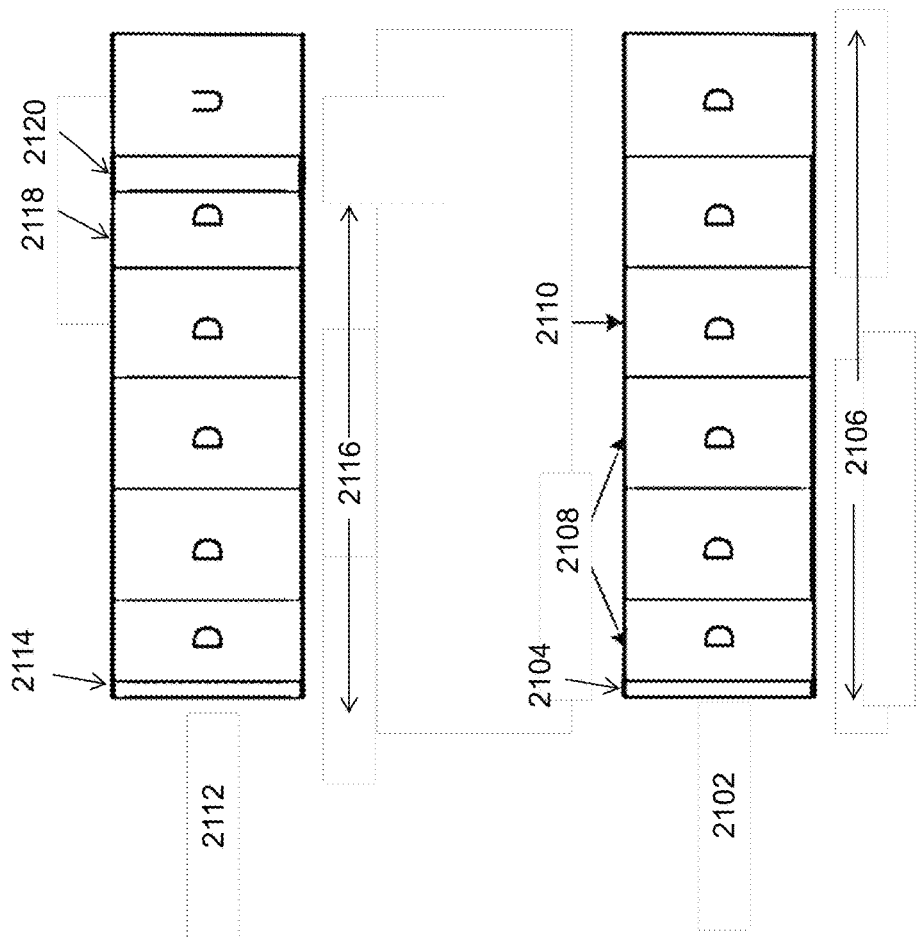
FIG. 29 illustrates two example unlicensed secondary cells (SCells), in accordance with certain embodiments.

In certain other embodiments, if a periodic SR transmission is blocked on a particular unlicensed cell due to that subframe being used as a DL subframe, then the SR may be transmitted on another unlicensed cell if the other unlicensed cell has an UL subframe that is currently available. An example with two unlicensed SCells is shown in FIG. 29. As depicted, wireless devices 110A-B are blocked from transmitting SRs on SCell 2102. Specifically, network node 115 may perform a LBT procedure 2104 and then send a burst of downlink transmissions 2106. As depicted, wireless device 110A has periodic SR opportunities 2108 and wireless device 110B has periodic SR opportunity 2110. However, the uplink subframes on the sPUCCH corresponding to periodic SR opportunities 2108 and 2110 are blocked by downlink transmissions 2106.

Where wireless devices 110A-B are monitoring DL on SCell 2112, however, wireless devices 110-B may determine an earlier UL sPUCCH opportunity on SCell 2112 and transmit their SRs there. As depicted in the example embodiment, network node 116 may perform a LBT procedure 2114 before sending a burst of downlink transmissions 2116. However, the last downlink TTI transmitted by network node 115 may include a partial DL subframe 2118. In certain embodiments, wireless devices 110A-B may transmit their SRs in the first transmission opportunity 2120 after the partial DL subframe 2118. In certain embodiments, the SRs of one or more of wireless devices 110A-B may contain additional information regarding the desired SCell on which the wireless devices 110A-B would like to receive an UL grant.

According to certain embodiments, a method for multiplexing scheduling requests in unlicensed bands is implemented in a wireless device. The method includes determining that a scheduling request (SR) cannot be transmitted on an uplink during a scheduled SR opportunity. The SR is transmitted in a first transmission opportunity following a partial downlink (DL) subframe from a network node.

According to certain embodiments, a wireless device for multiplexing scheduling requests in unlicensed bands includes a memory storing instructions and a processor operable to execute the instructions to cause the processor to determine that a scheduling request (SR) cannot be transmitted on an uplink during a scheduled SR opportunity. The SR is transmitted in a first transmission opportunity following a partial DL subframe from a network node.

According to certain embodiments, a method for multiplexing scheduling requests in unlicensed bands is implemented in a network node. The method includes transmitting, by the network node, signaling that indicates a partial DL subframe to be subsequently transmitted to a wireless device. The partial DL subframe is transmitted to the wireless device. A scheduling request (SR) is received from the wireless device in a first transmission opportunity following the partial DL subframe.

According to certain embodiments, a network node for multiplexing scheduling requests in unlicensed bands is provided. The network node includes a memory storing instructions and a processor operable to execute the instructions to cause the processor to transmit signaling that indicates a partial DL subframe to be subsequently transmitted to a wireless device. The partial DL subframe is transmitted to the wireless device and a scheduling request (SR) is received from the wireless device in a first transmission opportunity following the partial DL subframe.

Certain embodiments of the present disclosure may provide one or more technical advantages. For example, in certain embodiments deferred SR transmissions may be multiplexed in an efficient and robust manner. This may advantageously improve overall system performance for such a system. Other advantages may be readily apparent to one having skill in the art. Certain embodiments may have none, some, or all of the recited advantages.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method implemented in a wireless device, comprising:

determining that the wireless device has uplink (UL) data to transmit to a network node;

determining, based on signaling received from the network node indicating that the network node is to transmit one or more downlink (DL) subframes to the wireless device, that a scheduling request (SR) for scheduling transmission of the UL data to the network node cannot be transmitted in a physical uplink control channel (PUCCH) subframe during a preconfigured SR opportunity; and transmitting, based on signaling received from the network node indicating that the network node is to transmit a partial downlink (DL) subframe to the wireless device, the SR for scheduling transmission of the UL data to the network node in a short physical uplink control channel (sPUCCH) subframe following the partial DL subframe received from the network node.

2. The method of claim 1, wherein determining that the SR cannot be transmitted on in the PUCCH subframe during the preconfigured SR opportunity comprises detecting a conflict with a DL transmission from the network node during the preconfigured SR opportunity.

3. The method of claim 1, wherein a duration of the sPUCCH subframe is between one and four symbols in the time domain.

4. The method of claim 1, wherein the signaling received from the network node indicates the presence of the partial DL subframe.

5. The method of claim 4, wherein the signaling comprises Physical Downlink Control Channel (PDCCH) signaling.

6. The method of claim 1, wherein the SR is transmitted in the sPUCCH subframe concurrently with at least one additional transmission by another wireless device.

7. The method of claim 6, wherein the at least one additional transmission comprises an acknowledgement/non-acknowledgement (ACK/NACK) feedback associated with the partial DL subframe.

8. The method of claim 1, further comprising receiving configuration information comprising at least one transmission resource for transmitting the SR following the partial DL subframe from the network node.

9. A wireless device comprising:
a memory storing instructions; and
a processor operable to execute the instructions to cause the processor to:
determine that the wireless device has uplink (UL) data to transmit to a network node;
determine, based on signaling received from the network node indicating that the network node is to transmit one or more downlink (DL) subframes to the wireless device, that a scheduling request (SR) for scheduling transmission of the UL data to the network node cannot be transmitted on a physical uplink control channel (PUCCH) subframe during a preconfigured SR opportunity; and
transmit, based on signaling received from the network node indicating that the network node is to transmit a partial (DL) subframe to the wireless device, the SR for scheduling transmission of the UL data to the network node in a short physical uplink control channel (sPUCCH) subframe following the partial DL subframe received from the network node.

10. The wireless device of claim 9, wherein, when determining that the SR cannot be transmitted on in the PUCCH subframe during the preconfigured SR opportunity, the processor is operable to detect a conflict with a DL transmission from the network node during the preconfigured SR opportunity.

11. The wireless device of claim 9, wherein a duration of the sPUCCH subframe is between one and four symbols in the time domain.

12. The wireless device of claim 9, wherein the signaling received from the network node indicates the presence of the partial DL subframe.

13. The wireless device of claim 12, wherein the signaling comprises Physical Downlink Control Channel (PDCCH) signaling.

14. The wireless device of claim 9, wherein the SR is transmitted in the sPUCCH subframe concurrently with at least one additional transmission by another wireless device.

15. The wireless device of claim 14, wherein the at least one additional transmission comprises an acknowledgement/non-acknowledgement (ACK/NACK) feedback associated with the partial DL subframe.

16. The wireless device of claim 9 wherein the processor is further operable to receive configuration information comprising at least one transmission resource for transmitting the SR following the partial DL subframe from the network node.

17. The wireless device of claim 16, wherein the at least one transmission resource is selected from the group consisting of an UL interlace, an orthogonal cover code, and a cyclic shift.

18. The wireless device of claim 9, wherein the processor is further operable to:
determine that no resources are available for transmission of the SR during the preconfigured SR opportunity; and
determine that no resources are available for transmission of the SR during an transmission opportunity in a cell other than a cell associated with the network node.

19. The wireless device of claim 18, wherein the processor is further operable to:
initiate a random access procedure to the cell other than the cell associated with the network node; and
cancel one or more SRs.

20. A network node comprising:
a memory storing instructions; and
a processor operable to execute the instructions to cause the processor to:
transmit, to a wireless device, signaling indicating that the network node is to subsequently transmit one or more downlink (DL) subframes to the wireless device in a scheduling request (SR) transmission opportunity preconfigured for the wireless device, the SR transmission opportunity for transmitting a SR for scheduling transmission of uplink (UL) data from the wireless device to the network node in a physical uplink control channel (PUCCH) subframe during the preconfigured SR transmission opportunity;
transmit the one or more DL subframes to the wireless device in the preconfigured SR transmission opportunity; and
in a short physical uplink control channel (sPUCCH) subframe following the partial DL subframe, receive, from the wireless device, the SR for scheduling the transmission of the UL data from the wireless device to the network node.

21. The network node of claim 20, wherein the SR cannot be transmitted on in the PUCCH subframe during a preconfigured SR opportunity prior to the partial DL subframe due to a conflict with a DL transmission from the network node.

22. The network node of claim 20, wherein a duration of the sPUCCH subframe is between one and four symbols in the time domain.

23. The network node of claim 20, wherein the signaling comprises Physical Downlink Control Channel (PDCCH) signaling.

24. The network node of claim 20, wherein the SR is received in the sPUCCH subframe concurrently with at least one additional transmission by another wireless device.

25. The network node of claim 24, wherein the at least one additional transmission comprises an acknowledgement/non-acknowledgement (ACK/NACK) feedback associated with the partial DL subframe.

26. The network node of claim 20, wherein the processor is further operable to transmit, to the wireless device, configuration information comprising at least one transmission resource for transmitting the SR following the partial DL subframe.

27. The network node of claim 26, wherein the at least one transmission resource is selected from the group consisting of an UL interlace, an orthogonal cover code, and a cyclic shift.

* * * * *